(12) United States Patent  (10) Patent No.: US 12,124,903 B2
Wurmfeld  (45) Date of Patent: Oct. 22, 2024

(54) CARD WITH A TIME-SENSITIVE ELEMENT AND SYSTEMS AND METHODS FOR IMPLEMENTING THE SAME

(71) Applicant: Capital One Services, LLC, McLean, VA (US)

(72) Inventor: David Kelly Wurmfeld, Melbourne, FL (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 18/122,577

(22) Filed: Mar. 16, 2023

(65) Prior Publication Data

US 2024/0311605 A1  Sep. 19, 2024

(51) Int. Cl.
*G06K 19/077*  (2006.01)

(52) U.S. Cl.
CPC ................. *G06K 19/0772* (2013.01)

(58) Field of Classification Search
CPC .................................................. G06K 19/0772
USPC ........................................................ 235/492
See application file for complete search history.

(56) References Cited

U.S. PATENT DOCUMENTS

| | | |
|---|---|---|
| 4,683,553 A | 7/1987 | Mollier |
| 4,827,113 A | 5/1989 | Rikuna |
| 4,910,773 A | 3/1990 | Hazard et al. |
| 5,036,461 A | 7/1991 | Elliott et al. |
| 5,363,448 A | 11/1994 | Koopman, Jr. et al. |
| 5,377,270 A | 12/1994 | Koopman, Jr. et al. |
| 5,533,126 A | 7/1996 | Hazard |
| 5,537,314 A | 7/1996 | Kanter |
| 5,592,553 A | 1/1997 | Guski et al. |
| 5,616,901 A | 4/1997 | Crandall |
| 5,666,415 A | 9/1997 | Kaufman |
| 5,764,789 A | 6/1998 | Pare, Jr. et al. |
| 5,768,373 A | 6/1998 | Lohstroh et al. |
| 5,778,072 A | 7/1998 | Samar |
| 5,796,827 A | 8/1998 | Coppersmith et al. |
| 5,832,090 A | 11/1998 | Raspotnik |
| 5,883,810 A | 3/1999 | Franklin et al. |

(Continued)

FOREIGN PATENT DOCUMENTS

| | | |
|---|---|---|
| CA | 3010336 | 7/2017 |
| CN | 101192295 | 6/2008 |

(Continued)

OTHER PUBLICATIONS

Batina, Lejla and Poll, Erik, "SmartCards and RFID," PowerPoint Presentation for IPA Security Course, Digital Security at University of Nijmegen, Netherlands (date unknown), 75 pages.

(Continued)

*Primary Examiner* — Allyson N Trail
(74) *Attorney, Agent, or Firm* — KDW Firm PLLC; Andrew D. Kasnevich

(57) ABSTRACT

Exemplary embodiments disclose a card having a time-sensitive element and systems and methods for implementing the same. The card includes a sensitive element that, once activated, changes visually from one stage to a second stage, the second stage indicating the card's expiration. The system includes the card and a merchant device, and the method includes activating the sensitive element, triggering the starting event, and recording the activation date.

20 Claims, 8 Drawing Sheets

Card 600

(56) References Cited

U.S. PATENT DOCUMENTS

| | | | |
|---|---|---|---|
| 5,901,874 A | 5/1999 | Deters |
| 5,929,413 A | 7/1999 | Gardner |
| 5,960,411 A | 9/1999 | Hartman et al. |
| 6,021,203 A | 2/2000 | Douceur et al. |
| 6,049,328 A | 4/2000 | Vanderheiden |
| 6,058,373 A | 5/2000 | Blinn et al. |
| 6,061,666 A | 5/2000 | Do et al. |
| 6,105,013 A | 8/2000 | Curry et al. |
| 6,199,114 B1 | 3/2001 | White et al. |
| 6,199,762 B1 | 3/2001 | Hohle |
| 6,216,227 B1 | 4/2001 | Goldstein et al. |
| 6,227,447 B1 | 5/2001 | Campisano |
| 6,282,522 B1 | 8/2001 | Davis et al. |
| 6,324,271 B1 | 11/2001 | Sawyer et al. |
| 6,342,844 B1 | 1/2002 | Rozin |
| 6,367,011 B1 | 4/2002 | Lee et al. |
| 6,402,028 B1 | 6/2002 | Graham, Jr. et al. |
| 6,438,550 B1 | 8/2002 | Doyle et al. |
| 6,501,847 B2 | 12/2002 | Helot et al. |
| 6,631,197 B1 | 10/2003 | Taenzer |
| 6,641,050 B2 | 11/2003 | Kelley et al. |
| 6,655,585 B2 | 12/2003 | Shinn |
| 6,662,020 B1 | 12/2003 | Aaro et al. |
| 6,721,706 B1 | 4/2004 | Strubbe et al. |
| 6,731,778 B1 | 5/2004 | Oda et al. |
| 6,779,115 B1 | 8/2004 | Naim |
| 6,792,533 B2 | 9/2004 | Jablon |
| 6,829,711 B1 | 12/2004 | Kwok et al. |
| 6,834,271 B1 | 12/2004 | Hodgson et al. |
| 6,834,795 B1 | 12/2004 | Rasmussen et al. |
| 6,852,031 B1 | 2/2005 | Rowe |
| 6,865,547 B1 | 3/2005 | Brake, Jr. et al. |
| 6,873,260 B2 | 3/2005 | Lancos et al. |
| 6,877,656 B1 | 4/2005 | Jaros et al. |
| 6,889,198 B2 | 5/2005 | Kawan |
| 6,905,411 B2 | 6/2005 | Nguyen et al. |
| 6,910,627 B1 | 6/2005 | Simpson-Young et al. |
| 6,916,130 B1 * | 7/2005 | Holt ............... B41J 3/54 |
| | | 347/171 |
| 6,971,031 B2 | 11/2005 | Haala |
| 6,990,588 B1 | 1/2006 | Yasukura |
| 7,006,986 B1 | 2/2006 | Sines et al. |
| 7,085,931 B1 | 8/2006 | Smith et al. |
| 7,127,605 B1 | 10/2006 | Montgomery et al. |
| 7,128,274 B2 | 10/2006 | Kelley et al. |
| 7,140,550 B2 | 11/2006 | Ramachandran |
| 7,152,045 B2 | 12/2006 | Hoffman |
| 7,165,727 B2 | 1/2007 | de Jong |
| 7,175,076 B1 | 2/2007 | Block et al. |
| 7,202,773 B1 | 4/2007 | Oba et al. |
| 7,206,806 B2 | 4/2007 | Pineau |
| 7,232,073 B1 | 6/2007 | de Jong |
| 7,246,752 B2 | 7/2007 | Brown |
| 7,254,569 B2 | 8/2007 | Goodman et al. |
| 7,263,507 B1 | 8/2007 | Brake, Jr. et al. |
| 7,270,276 B2 | 9/2007 | Vayssiere |
| 7,278,025 B2 | 10/2007 | Saito et al. |
| 7,287,692 B1 | 10/2007 | Patel et al. |
| 7,290,709 B2 | 11/2007 | Tsai et al. |
| 7,306,143 B2 | 12/2007 | Bonneau, Jr. et al. |
| 7,319,986 B2 | 1/2008 | Praisner et al. |
| 7,325,132 B2 | 1/2008 | Takayama et al. |
| 7,373,515 B2 | 5/2008 | Owen et al. |
| 7,374,099 B2 | 5/2008 | de Jong |
| 7,375,616 B2 | 5/2008 | Rowse et al. |
| 7,380,710 B2 | 6/2008 | Brown |
| 7,424,977 B2 | 9/2008 | Smets et al. |
| 7,453,439 B1 | 11/2008 | Kushler et al. |
| 7,472,829 B2 | 1/2009 | Brown |
| 7,487,357 B2 | 2/2009 | Smith et al. |
| 7,568,631 B2 | 8/2009 | Gibbs et al. |
| 7,584,153 B2 | 9/2009 | Brown et al. |
| 7,597,250 B2 | 10/2009 | Finn |
| 7,628,322 B2 | 12/2009 | Holtmanns et al. |
| 7,652,578 B2 | 1/2010 | Braun et al. |
| 7,689,832 B2 | 3/2010 | Talmor et al. |
| 7,703,142 B1 | 4/2010 | Wilson et al. |
| 7,742,367 B2 * | 6/2010 | Haas ............... G04F 1/06 |
| | | 368/327 |
| 7,748,609 B2 | 7/2010 | Sachdeva et al. |
| 7,748,617 B2 | 7/2010 | Gray |
| 7,748,636 B2 | 7/2010 | Finn |
| 7,762,457 B2 | 7/2010 | Bonalle et al. |
| 7,789,302 B2 | 9/2010 | Tame |
| 7,793,851 B2 | 9/2010 | Mullen |
| 7,796,013 B2 | 9/2010 | Murakami et al. |
| 7,801,799 B1 | 9/2010 | Brake, Jr. et al. |
| 7,801,829 B2 | 9/2010 | Gray et al. |
| 7,805,755 B2 | 9/2010 | Brown et al. |
| 7,809,643 B2 | 10/2010 | Phillips et al. |
| 7,827,115 B2 | 11/2010 | Weller et al. |
| 7,828,214 B2 | 11/2010 | Narendra et al. |
| 7,848,746 B2 | 12/2010 | Juels |
| 7,882,553 B2 | 2/2011 | Tuliani |
| 7,900,048 B2 | 3/2011 | Andersson |
| 7,908,216 B1 | 3/2011 | Davis et al. |
| 7,922,082 B2 | 4/2011 | Muscato |
| 7,933,589 B1 | 4/2011 | Mamdani et al. |
| 7,949,559 B2 | 5/2011 | Freiberg |
| 7,954,716 B2 | 6/2011 | Narendra et al. |
| 7,954,723 B2 | 6/2011 | Charrat |
| 7,962,369 B2 | 6/2011 | Rosenberg |
| 7,993,197 B2 | 8/2011 | Mamdani et al. |
| 8,005,426 B2 | 8/2011 | Huomo et al. |
| 8,010,405 B1 | 8/2011 | Bortolin et al. |
| RE42,762 E | 9/2011 | Shin |
| 8,041,954 B2 | 10/2011 | Plesman |
| 8,060,012 B2 | 11/2011 | Sklovsky et al. |
| 8,074,877 B2 | 12/2011 | Mullen et al. |
| 8,082,450 B2 | 12/2011 | Frey et al. |
| 8,095,113 B2 | 1/2012 | Kean et al. |
| 8,099,332 B2 | 1/2012 | Lemay et al. |
| 8,103,249 B2 | 1/2012 | Markison |
| 8,108,687 B2 | 1/2012 | Ellis et al. |
| 8,127,143 B2 | 2/2012 | Abdallah et al. |
| 8,135,648 B2 | 3/2012 | Oram et al. |
| 8,140,010 B2 | 3/2012 | Symons et al. |
| 8,141,136 B2 | 3/2012 | Lee et al. |
| 8,150,321 B2 | 4/2012 | Winter et al. |
| 8,150,767 B2 | 4/2012 | Wankmueller |
| 8,186,602 B2 | 5/2012 | Itay et al. |
| 8,196,131 B1 | 6/2012 | von Behren et al. |
| 8,215,563 B2 | 7/2012 | Levy et al. |
| 8,224,753 B2 | 7/2012 | Atef et al. |
| 8,232,879 B2 | 7/2012 | Davis |
| 8,233,841 B2 | 7/2012 | Griffin et al. |
| 8,245,292 B2 | 8/2012 | Buer |
| 8,249,654 B1 | 8/2012 | Zhu |
| 8,266,451 B2 | 9/2012 | Leydier et al. |
| 8,285,329 B1 | 10/2012 | Zhu |
| 8,302,872 B2 | 11/2012 | Mullen |
| 8,312,519 B1 | 11/2012 | Bailey et al. |
| 8,316,237 B1 | 11/2012 | Felsher et al. |
| 8,332,272 B2 | 12/2012 | Fisher |
| 8,343,437 B2 * | 1/2013 | Patel ............... G01D 3/10 |
| | | 436/2 |
| 8,365,988 B1 | 2/2013 | Medina, III et al. |
| 8,369,960 B2 | 2/2013 | Tran et al. |
| 8,371,501 B1 | 2/2013 | Hopkins |
| 8,381,307 B2 | 2/2013 | Cimino |
| 8,391,719 B2 | 3/2013 | Alameh et al. |
| 8,417,231 B2 | 4/2013 | Sanding et al. |
| 8,439,271 B2 | 5/2013 | Smets et al. |
| 8,475,367 B1 | 7/2013 | Yuen et al. |
| 8,489,112 B2 | 7/2013 | Roeding et al. |
| 8,511,542 B2 | 8/2013 | Pan |
| 8,559,872 B2 | 10/2013 | Butler |
| 8,566,916 B1 | 10/2013 | Vernon et al. |
| 8,567,670 B2 | 10/2013 | Stanfield et al. |
| 8,572,386 B2 | 10/2013 | Takekawa et al. |
| 8,577,810 B1 | 11/2013 | Dalit et al. |
| 8,583,454 B2 | 11/2013 | Beraja et al. |
| 8,589,335 B2 | 11/2013 | Smith et al. |
| 8,594,730 B2 | 11/2013 | Bona et al. |

(56) References Cited

U.S. PATENT DOCUMENTS

| | | |
|---|---|---|
| 8,615,468 B2 | 12/2013 | Varadarajan |
| 8,620,218 B2 | 12/2013 | Awad |
| 8,667,285 B2 | 3/2014 | Coulier et al. |
| 8,723,941 B1 | 5/2014 | Shirbabadi et al. |
| 8,726,405 B1 | 5/2014 | Bailey et al. |
| 8,740,073 B2 | 6/2014 | Vijayshankar et al. |
| 8,750,514 B2 | 6/2014 | Gallo et al. |
| 8,752,189 B2 | 6/2014 | De Jong |
| 8,794,509 B2 | 8/2014 | Bishop et al. |
| 8,799,668 B2 | 8/2014 | Cheng |
| 8,806,592 B2 | 8/2014 | Ganesan |
| 8,807,440 B1 | 8/2014 | Von Behren et al. |
| 8,811,892 B2 | 8/2014 | Khan et al. |
| 8,814,039 B2 | 8/2014 | Bishop et al. |
| 8,814,052 B2 | 8/2014 | Bona et al. |
| 8,818,867 B2 | 8/2014 | Baldwin et al. |
| 8,850,538 B1 | 9/2014 | Vernon et al. |
| 8,861,733 B2 | 10/2014 | Benteo et al. |
| 8,880,027 B1 | 11/2014 | Darringer |
| 8,888,002 B2 | 11/2014 | Chesney et al. |
| 8,898,088 B2 | 11/2014 | Springer et al. |
| 8,934,837 B2 | 1/2015 | Zhu et al. |
| 8,977,569 B2 | 3/2015 | Rao |
| 8,994,498 B2 | 3/2015 | Agrafioti et al. |
| 9,004,365 B2 | 4/2015 | Bona et al. |
| 9,038,894 B2 | 5/2015 | Khalid |
| 9,042,814 B2 | 5/2015 | Royston et al. |
| 9,047,531 B2 | 6/2015 | Showering et al. |
| 9,069,976 B2 | 6/2015 | Toole et al. |
| 9,081,948 B2 | 7/2015 | Magne |
| 9,104,853 B2 | 8/2015 | Venkataramani et al. |
| 9,118,663 B1 | 8/2015 | Bailey et al. |
| 9,122,964 B2 | 9/2015 | Krawczewicz |
| 9,129,280 B2 | 9/2015 | Bona et al. |
| 9,152,832 B2 | 10/2015 | Royston et al. |
| 9,203,800 B2 | 12/2015 | Izu et al. |
| 9,209,867 B2 | 12/2015 | Royston |
| 9,251,330 B2 | 2/2016 | Boivie et al. |
| 9,251,518 B2 | 2/2016 | Levin et al. |
| 9,258,715 B2 | 2/2016 | Borghei |
| 9,270,337 B2 | 2/2016 | Zhu et al. |
| 9,306,626 B2 | 4/2016 | Hall et al. |
| 9,306,942 B1 | 4/2016 | Bailey et al. |
| 9,324,066 B2 | 4/2016 | Archer et al. |
| 9,324,067 B2 | 4/2016 | Van Os et al. |
| 9,332,587 B2 | 5/2016 | Salahshoor |
| 9,338,622 B2 | 5/2016 | Bjontegard |
| 9,373,141 B1 | 6/2016 | Shakkarwar |
| 9,379,841 B2 | 6/2016 | Fine et al. |
| 9,413,430 B2 | 8/2016 | Royston et al. |
| 9,413,768 B1 | 8/2016 | Gregg et al. |
| 9,420,496 B1 | 8/2016 | Indurkar |
| 9,426,132 B1 | 8/2016 | Alikhani |
| 9,432,339 B1 | 8/2016 | Bowness |
| 9,448,182 B2 * | 9/2016 | Haarer .................. G01N 21/78 |
| 9,455,968 B1 | 9/2016 | Machani et al. |
| 9,473,509 B2 | 10/2016 | Arsanjani et al. |
| 9,491,626 B2 | 11/2016 | Sharma et al. |
| 9,553,637 B2 | 1/2017 | Yang et al. |
| 9,619,952 B1 | 4/2017 | Zhao et al. |
| 9,635,000 B1 | 4/2017 | Muftic |
| 9,665,858 B1 | 5/2017 | Kumar |
| 9,674,705 B2 | 6/2017 | Rose et al. |
| 9,679,286 B2 | 6/2017 | Colnot et al. |
| 9,680,942 B2 | 6/2017 | Dimmick |
| 9,710,804 B2 | 7/2017 | Zhou et al. |
| 9,740,342 B2 | 8/2017 | Paulsen et al. |
| 9,740,988 B1 | 8/2017 | Levin et al. |
| 9,763,097 B2 | 9/2017 | Robinson et al. |
| 9,767,329 B2 | 9/2017 | Forster |
| 9,769,662 B1 | 9/2017 | Queru |
| 9,773,151 B2 | 9/2017 | Mil'shtein et al. |
| 9,780,953 B2 | 10/2017 | Gaddam et al. |
| 9,891,823 B2 | 2/2018 | Feng et al. |
| 9,940,571 B1 | 4/2018 | Herrington |
| 9,953,323 B2 | 4/2018 | Candelore et al. |
| 9,961,194 B1 | 5/2018 | Wiechman et al. |
| 9,965,756 B2 | 5/2018 | Davis et al. |
| 9,965,911 B2 | 5/2018 | Wishne |
| 9,978,058 B2 | 5/2018 | Wurmfeld et al. |
| 10,043,164 B2 | 8/2018 | Dogin et al. |
| 10,075,437 B1 | 9/2018 | Costigan et al. |
| 10,129,648 B1 | 11/2018 | Hernandez et al. |
| 10,133,979 B1 | 11/2018 | Eidam et al. |
| 10,217,105 B1 | 2/2019 | Sangi et al. |
| 2001/0010723 A1 | 8/2001 | Pinkas |
| 2001/0029485 A1 | 10/2001 | Brody et al. |
| 2001/0034702 A1 | 10/2001 | Mockett et al. |
| 2001/0054003 A1 | 12/2001 | Chien et al. |
| 2002/0078345 A1 | 6/2002 | Sandhu et al. |
| 2002/0093530 A1 | 7/2002 | Krothapalli et al. |
| 2002/0100808 A1 | 8/2002 | Norwood et al. |
| 2002/0105183 A1 * | 8/2002 | Holt ...................... B42D 25/00 283/81 |
| 2002/0120583 A1 | 8/2002 | Keresman, III et al. |
| 2002/0152116 A1 | 10/2002 | Yan et al. |
| 2002/0153424 A1 | 10/2002 | Li |
| 2002/0165827 A1 | 11/2002 | Gien et al. |
| 2003/0023554 A1 | 1/2003 | Yap et al. |
| 2003/0034873 A1 | 2/2003 | Chase et al. |
| 2003/0055727 A1 | 3/2003 | Walker et al. |
| 2003/0078882 A1 | 4/2003 | Sukeda et al. |
| 2003/0167350 A1 | 9/2003 | Davis et al. |
| 2003/0208449 A1 | 11/2003 | Diao |
| 2004/0015958 A1 | 1/2004 | Veil et al. |
| 2004/0039919 A1 | 2/2004 | Takayama et al. |
| 2004/0127256 A1 | 7/2004 | Goldthwaite et al. |
| 2004/0215674 A1 | 10/2004 | Odinak et al. |
| 2004/0230799 A1 | 11/2004 | Davis |
| 2005/0044367 A1 | 2/2005 | Gasparini et al. |
| 2005/0075985 A1 | 4/2005 | Cartmell |
| 2005/0081038 A1 | 4/2005 | Arditti Modiano et al. |
| 2005/0138387 A1 | 6/2005 | Lam et al. |
| 2005/0156026 A1 | 7/2005 | Ghosh et al. |
| 2005/0160049 A1 | 7/2005 | Lundholm |
| 2005/0195975 A1 | 9/2005 | Kawakita |
| 2005/0247797 A1 | 11/2005 | Ramachandran |
| 2006/0006230 A1 | 1/2006 | Bear et al. |
| 2006/0040726 A1 | 2/2006 | Szrek et al. |
| 2006/0041402 A1 | 2/2006 | Baker |
| 2006/0044153 A1 | 3/2006 | Dawidowsky |
| 2006/0047954 A1 | 3/2006 | Sachdeva et al. |
| 2006/0085848 A1 | 4/2006 | Aissi et al. |
| 2006/0136334 A1 | 6/2006 | Atkinson et al. |
| 2006/0173985 A1 | 8/2006 | Moore |
| 2006/0174331 A1 | 8/2006 | Schuetz |
| 2006/0242698 A1 | 10/2006 | Inskeep et al. |
| 2006/0280338 A1 | 12/2006 | Rabb |
| 2007/0033642 A1 | 2/2007 | Ganesan et al. |
| 2007/0055630 A1 | 3/2007 | Gauthier et al. |
| 2007/0061266 A1 | 3/2007 | Moore et al. |
| 2007/0061487 A1 | 3/2007 | Moore et al. |
| 2007/0116292 A1 | 5/2007 | Kurita et al. |
| 2007/0118745 A1 | 5/2007 | Buer |
| 2007/0197261 A1 | 8/2007 | Humbel |
| 2007/0224969 A1 | 9/2007 | Rao |
| 2007/0241182 A1 | 10/2007 | Buer |
| 2007/0256134 A1 | 11/2007 | Lehtonen et al. |
| 2007/0258594 A1 | 11/2007 | Sandhu et al. |
| 2007/0278291 A1 | 12/2007 | Rans et al. |
| 2008/0008315 A1 | 1/2008 | Fontana et al. |
| 2008/0011831 A1 | 1/2008 | Bonalle et al. |
| 2008/0014867 A1 | 1/2008 | Finn |
| 2008/0035738 A1 | 2/2008 | Mullen |
| 2008/0071681 A1 | 3/2008 | Khalid |
| 2008/0072303 A1 | 3/2008 | Syed |
| 2008/0086767 A1 | 4/2008 | Kulkarni et al. |
| 2008/0103968 A1 | 5/2008 | Bies et al. |
| 2008/0109309 A1 | 5/2008 | Landau et al. |
| 2008/0110983 A1 | 5/2008 | Ashfield |
| 2008/0120711 A1 | 5/2008 | Dispensa |
| 2008/0156873 A1 | 7/2008 | Wilhelm et al. |
| 2008/0162312 A1 | 7/2008 | Sklovsky et al. |
| 2008/0164308 A1 | 7/2008 | Aaron et al. |

(56) References Cited

U.S. PATENT DOCUMENTS

| | | |
|---|---|---|
| 2008/0207307 A1 | 8/2008 | Cunningham, II et al. |
| 2008/0209543 A1 | 8/2008 | Aaron |
| 2008/0223918 A1 | 9/2008 | Williams et al. |
| 2008/0285746 A1 | 11/2008 | Landrock et al. |
| 2008/0308641 A1 | 12/2008 | Finn |
| 2009/0037275 A1 | 2/2009 | Pollio |
| 2009/0048026 A1 | 2/2009 | French |
| 2009/0132417 A1 | 5/2009 | Scipioni et al. |
| 2009/0143104 A1 | 6/2009 | Loh et al. |
| 2009/0171682 A1 | 7/2009 | Dixon et al. |
| 2009/0210308 A1 | 8/2009 | Toomer et al. |
| 2009/0235339 A1 | 9/2009 | Mennes et al. |
| 2009/0249077 A1 | 10/2009 | Gargaro et al. |
| 2009/0282264 A1 | 11/2009 | Amiel et al. |
| 2010/0023449 A1 | 1/2010 | Skowronek et al. |
| 2010/0023455 A1 | 1/2010 | Dispensa et al. |
| 2010/0029202 A1 | 2/2010 | Jolivet et al. |
| 2010/0033310 A1 | 2/2010 | Narendra et al. |
| 2010/0036769 A1 | 2/2010 | Winters et al. |
| 2010/0078471 A1 | 4/2010 | Lin et al. |
| 2010/0082491 A1 | 4/2010 | Rosenblatt et al. |
| 2010/0094754 A1 | 4/2010 | Bertran et al. |
| 2010/0095130 A1 | 4/2010 | Bertran et al. |
| 2010/0100480 A1 | 4/2010 | Altman et al. |
| 2010/0114731 A1 | 5/2010 | Kingston et al. |
| 2010/0192230 A1 | 7/2010 | Steeves et al. |
| 2010/0207742 A1 | 8/2010 | Buhot et al. |
| 2010/0211797 A1 | 8/2010 | Westerveld et al. |
| 2010/0240413 A1 | 9/2010 | He et al. |
| 2010/0257357 A1 | 10/2010 | McClain |
| 2010/0312634 A1 | 12/2010 | Cervenka |
| 2010/0312635 A1 | 12/2010 | Cervenka |
| 2011/0028160 A1 | 2/2011 | Roeding et al. |
| 2011/0035604 A1 | 2/2011 | Habraken |
| 2011/0060631 A1 | 3/2011 | Grossman et al. |
| 2011/0068170 A1 | 3/2011 | Lehman |
| 2011/0084132 A1 | 4/2011 | Tofighbakhsh |
| 2011/0101093 A1 | 5/2011 | Ehrensvard |
| 2011/0113245 A1 | 5/2011 | Varadrajan |
| 2011/0125638 A1 | 5/2011 | Davis et al. |
| 2011/0131415 A1 | 6/2011 | Schneider |
| 2011/0153437 A1 | 6/2011 | Archer et al. |
| 2011/0153496 A1 | 6/2011 | Royyuru |
| 2011/0208658 A1 | 8/2011 | Makhotin |
| 2011/0208965 A1 | 8/2011 | Machani |
| 2011/0211219 A1 | 9/2011 | Bradley |
| 2011/0218911 A1 | 9/2011 | Spodak |
| 2011/0238564 A1 | 9/2011 | Lim et al. |
| 2011/0246780 A1 | 10/2011 | Yeap et al. |
| 2011/0258452 A1 | 10/2011 | Coulier et al. |
| 2011/0280406 A1 | 11/2011 | Ma et al. |
| 2011/0282785 A1 | 11/2011 | Chin |
| 2011/0294418 A1 | 12/2011 | Chen |
| 2011/0312271 A1 | 12/2011 | Ma et al. |
| 2012/0024947 A1 | 2/2012 | Naelon |
| 2012/0030047 A1 | 2/2012 | Fuentes et al. |
| 2012/0030121 A1 | 2/2012 | Grellier |
| 2012/0047071 A1 | 2/2012 | Mullen et al. |
| 2012/0079281 A1 | 3/2012 | Lowenstein et al. |
| 2012/0109735 A1 | 5/2012 | Krawczewicz et al. |
| 2012/0109764 A1 | 5/2012 | Martin et al. |
| 2012/0143754 A1 | 6/2012 | Patel |
| 2012/0150737 A1 | 6/2012 | Rottink |
| 2012/0178366 A1 | 7/2012 | Levy et al. |
| 2012/0196583 A1 | 8/2012 | Kindo |
| 2012/0207305 A1 | 8/2012 | Gallo et al. |
| 2012/0209773 A1 | 8/2012 | Ranganathan |
| 2012/0238206 A1 | 9/2012 | Singh et al. |
| 2012/0239560 A1 | 9/2012 | Pourfallah et al. |
| 2012/0252350 A1 | 10/2012 | Steinmetz et al. |
| 2012/0254394 A1 | 10/2012 | Barras |
| 2012/0284194 A1 | 11/2012 | Liu et al. |
| 2012/0290472 A1 | 11/2012 | Mullen et al. |
| 2012/0296818 A1 | 11/2012 | Nuzzi et al. |
| 2012/0316992 A1 | 12/2012 | Oborne |
| 2012/0317035 A1 | 12/2012 | Royyuru et al. |
| 2012/0317628 A1 | 12/2012 | Yeager |
| 2013/0005245 A1 | 1/2013 | Royston |
| 2013/0008956 A1 | 1/2013 | Ashfield |
| 2013/0026229 A1 | 1/2013 | Jarman et al. |
| 2013/0048713 A1 | 2/2013 | Pan |
| 2013/0054474 A1 | 2/2013 | Yeager |
| 2013/0065564 A1 | 3/2013 | Conner et al. |
| 2013/0080228 A1 | 3/2013 | Fisher |
| 2013/0080229 A1 | 3/2013 | Fisher |
| 2013/0099587 A1 | 4/2013 | Lou |
| 2013/0104251 A1 | 4/2013 | Moore et al. |
| 2013/0106576 A1 | 5/2013 | Hinman et al. |
| 2013/0119130 A1 | 5/2013 | Braams |
| 2013/0130614 A1 | 5/2013 | Busch-Sorensen |
| 2013/0144793 A1 | 6/2013 | Royston |
| 2013/0171929 A1 | 7/2013 | Adams et al. |
| 2013/0179351 A1 | 7/2013 | Wallner |
| 2013/0185772 A1 | 7/2013 | Jaudon et al. |
| 2013/0191279 A1 | 7/2013 | Calman et al. |
| 2013/0200999 A1 | 8/2013 | Spodak et al. |
| 2013/0216108 A1 | 8/2013 | Hwang et al. |
| 2013/0226791 A1 | 8/2013 | Springer et al. |
| 2013/0226796 A1 | 8/2013 | Jiang et al. |
| 2013/0232082 A1 | 9/2013 | Krawczewicz et al. |
| 2013/0238894 A1 | 9/2013 | Ferg et al. |
| 2013/0282360 A1 | 10/2013 | Shimota et al. |
| 2013/0303085 A1 | 11/2013 | Boucher et al. |
| 2013/0304651 A1 | 11/2013 | Smith |
| 2013/0312082 A1 | 11/2013 | Izu et al. |
| 2013/0314593 A1 | 11/2013 | Reznik et al. |
| 2013/0344857 A1 | 12/2013 | Berionne et al. |
| 2014/0002238 A1 | 1/2014 | Taveau et al. |
| 2014/0019352 A1 | 1/2014 | Shrivastava |
| 2014/0027506 A1 | 1/2014 | Heo et al. |
| 2014/0032409 A1 | 1/2014 | Rosano |
| 2014/0032410 A1 | 1/2014 | Georgiev et al. |
| 2014/0040120 A1 | 2/2014 | Cho et al. |
| 2014/0040139 A1 | 2/2014 | Brudnicki et al. |
| 2014/0040147 A1 | 2/2014 | Varadarakan et al. |
| 2014/0047235 A1 | 2/2014 | Lessiak et al. |
| 2014/0067690 A1 | 3/2014 | Pitroda et al. |
| 2014/0074637 A1 | 3/2014 | Hammad |
| 2014/0074655 A1 | 3/2014 | Lim et al. |
| 2014/0081720 A1 | 3/2014 | Wu |
| 2014/0138435 A1 | 5/2014 | Khalid |
| 2014/0171034 A1 | 6/2014 | Aleksin et al. |
| 2014/0171039 A1 | 6/2014 | Bjontegard |
| 2014/0172700 A1 | 6/2014 | Teuwen et al. |
| 2014/0180851 A1 | 6/2014 | Fisher |
| 2014/0208112 A1 | 7/2014 | McDonald et al. |
| 2014/0214674 A1 | 7/2014 | Narula |
| 2014/0229375 A1 | 8/2014 | Zaytzsev et al. |
| 2014/0245391 A1 | 8/2014 | Adenuga |
| 2014/0256251 A1 | 9/2014 | Caceres et al. |
| 2014/0258099 A1 | 9/2014 | Rosano |
| 2014/0258113 A1 | 9/2014 | Gauthier et al. |
| 2014/0258125 A1 | 9/2014 | Gerber et al. |
| 2014/0274179 A1 | 9/2014 | Zhu et al. |
| 2014/0279479 A1 | 9/2014 | Maniar et al. |
| 2014/0337235 A1 | 11/2014 | Van Heerden et al. |
| 2014/0339315 A1 | 11/2014 | Ko |
| 2014/0346860 A1 | 11/2014 | Aubry et al. |
| 2014/0365780 A1 | 12/2014 | Movassaghi |
| 2014/0379361 A1 | 12/2014 | Mahadkar et al. |
| 2015/0012444 A1 | 1/2015 | Brown et al. |
| 2015/0032635 A1 | 1/2015 | Guise |
| 2015/0071486 A1 | 3/2015 | Rhoads et al. |
| 2015/0088757 A1 | 3/2015 | Zhou et al. |
| 2015/0089586 A1 | 3/2015 | Ballesteros |
| 2015/0134452 A1 | 5/2015 | Williams |
| 2015/0140960 A1 | 5/2015 | Powell et al. |
| 2015/0154595 A1 | 6/2015 | Collinge et al. |
| 2015/0170138 A1 | 6/2015 | Rao |
| 2015/0178724 A1 | 6/2015 | Ngo et al. |
| 2015/0186871 A1 | 7/2015 | Laracey |
| 2015/0205379 A1 | 7/2015 | Mag et al. |
| 2015/0302409 A1 | 10/2015 | Malek |
| 2015/0317626 A1 | 11/2015 | Ran et al. |

(56) References Cited

U.S. PATENT DOCUMENTS

| | | |
|---|---|---|
| 2015/0332266 A1 | 11/2015 | Friedlander et al. |
| 2015/0339474 A1 | 11/2015 | Paz et al. |
| 2015/0371234 A1 | 12/2015 | Huang et al. |
| 2016/0012465 A1 | 1/2016 | Sharp |
| 2016/0026997 A1 | 1/2016 | Tsui et al. |
| 2016/0048913 A1 | 2/2016 | Rausaria et al. |
| 2016/0055480 A1 | 2/2016 | Shah |
| 2016/0057619 A1 | 2/2016 | Lopez |
| 2016/0065370 A1 | 3/2016 | Le Saint et al. |
| 2016/0087957 A1 | 3/2016 | Shah et al. |
| 2016/0092696 A1 | 3/2016 | Guglani et al. |
| 2016/0148193 A1 | 5/2016 | Kelley et al. |
| 2016/0232523 A1 | 8/2016 | Venot et al. |
| 2016/0239672 A1 | 8/2016 | Khan et al. |
| 2016/0253651 A1 | 9/2016 | Park et al. |
| 2016/0255072 A1 | 9/2016 | Liu |
| 2016/0267486 A1 | 9/2016 | Mitra et al. |
| 2016/0277383 A1 | 9/2016 | Guyomarc'h et al. |
| 2016/0277388 A1 | 9/2016 | Lowe et al. |
| 2016/0307187 A1 | 10/2016 | Guo et al. |
| 2016/0307189 A1 | 10/2016 | Zarakas et al. |
| 2016/0314472 A1 | 10/2016 | Ashfield |
| 2016/0330027 A1 | 11/2016 | Ebrahimi |
| 2016/0335531 A1 | 11/2016 | Mullen et al. |
| 2016/0379217 A1 | 12/2016 | Hammad |
| 2017/0004502 A1 | 1/2017 | Quentin et al. |
| 2017/0011395 A1 | 1/2017 | Pillai et al. |
| 2017/0011406 A1 | 1/2017 | Tunnell et al. |
| 2017/0017957 A1 | 1/2017 | Radu |
| 2017/0017964 A1 | 1/2017 | Janefalkar et al. |
| 2017/0024716 A1 | 1/2017 | Jiam et al. |
| 2017/0039566 A1 | 2/2017 | Schipperheijn |
| 2017/0041759 A1 | 2/2017 | Gantert et al. |
| 2017/0068950 A1 | 3/2017 | Kwon |
| 2017/0103388 A1 | 4/2017 | Pillai et al. |
| 2017/0104739 A1 | 4/2017 | Lansler et al. |
| 2017/0109509 A1 | 4/2017 | Baghdasaryan |
| 2017/0109730 A1 | 4/2017 | Locke et al. |
| 2017/0116447 A1 | 4/2017 | Cimino et al. |
| 2017/0124568 A1 | 5/2017 | Moghadam |
| 2017/0140379 A1 | 5/2017 | Deck |
| 2017/0154328 A1 | 6/2017 | Zarakas et al. |
| 2017/0154333 A1 | 6/2017 | Gleeson et al. |
| 2017/0180134 A1 | 6/2017 | King |
| 2017/0230189 A1 | 8/2017 | Toll et al. |
| 2017/0237301 A1 | 8/2017 | Elad et al. |
| 2017/0289127 A1 | 10/2017 | Hendrick |
| 2017/0295013 A1 | 10/2017 | Claes |
| 2017/0316696 A1 | 11/2017 | Bartel |
| 2017/0317834 A1 | 11/2017 | Smith et al. |
| 2017/0330173 A1 | 11/2017 | Woo et al. |
| 2017/0374070 A1 | 12/2017 | Shah et al. |
| 2018/0034507 A1 | 2/2018 | Wobak et al. |
| 2018/0039986 A1 | 2/2018 | Essebag et al. |
| 2018/0068316 A1 | 3/2018 | Essebag et al. |
| 2018/0129945 A1 | 5/2018 | Saxena et al. |
| 2018/0160255 A1 | 6/2018 | Park |
| 2018/0191501 A1 | 7/2018 | Lindemann |
| 2018/0205712 A1 | 7/2018 | Versteeg et al. |
| 2018/0240106 A1 | 8/2018 | Garrett et al. |
| 2018/0254909 A1 | 9/2018 | Hancock |
| 2018/0268132 A1 | 9/2018 | Buer et al. |
| 2018/0270214 A1 | 9/2018 | Caterino et al. |
| 2018/0294959 A1 | 10/2018 | Traynor et al. |
| 2018/0300716 A1 | 10/2018 | Carlson |
| 2018/0302396 A1 | 10/2018 | Camenisch et al. |
| 2018/0315050 A1 | 11/2018 | Hammad |
| 2018/0316666 A1 | 11/2018 | Koved et al. |
| 2018/0322486 A1 | 11/2018 | Deliwala et al. |
| 2018/0359100 A1 | 12/2018 | Gaddam et al. |
| 2019/0014107 A1 | 1/2019 | George |
| 2019/0019375 A1 | 1/2019 | Foley |
| 2019/0036678 A1 | 1/2019 | Ahmed |
| 2019/0238517 A1 | 8/2019 | D'Agostino et al. |
| 2022/0415112 A1* | 12/2022 | Weisbecker .......... G07F 7/0813 |

FOREIGN PATENT DOCUMENTS

| | | |
|---|---|---|
| CN | 103023643 | 4/2013 |
| CN | 103417202 | 12/2013 |
| EP | 1 085 424 | 3/2001 |
| EP | 1 223 565 | 7/2002 |
| EP | 1 265 186 | 12/2002 |
| EP | 1 783 919 | 5/2007 |
| EP | 2 852 070 | 1/2009 |
| EP | 2 139 196 | 12/2009 |
| EP | 1 469 419 | 2/2012 |
| GB | 2 457 221 | 8/2009 |
| GB | 2 516 861 | 2/2015 |
| GB | 2 551 907 | 1/2018 |
| KR | 101508320 | 4/2015 |
| WO | WO 00/49586 | 8/2000 |
| WO | WO 2006070189 | 7/2006 |
| WO | WO 2008055170 | 5/2008 |
| WO | WO 2009025605 | 2/2009 |
| WO | WO 2010049252 | 5/2010 |
| WO | WO 2011112158 | 9/2011 |
| WO | WO 2012001624 | 1/2012 |
| WO | WO 2013039395 | 3/2013 |
| WO | WO 2013155562 | 10/2013 |
| WO | WO 2013192358 | 12/2013 |
| WO | WO 2014043278 | 3/2014 |
| WO | WO 2014170741 | 10/2014 |
| WO | WO 2015179649 | 11/2015 |
| WO | WO 2015183818 | 12/2015 |
| WO | WO 2016097718 | 6/2016 |
| WO | WO 2016160816 | 10/2016 |
| WO | WO 2016168394 | 10/2016 |
| WO | WO 2017042375 | 3/2017 |
| WO | WO 2017042400 | 3/2017 |
| WO | WO 2017157859 | 9/2017 |
| WO | WO 2017208063 | 12/2017 |
| WO | WO 2018063809 | 4/2018 |
| WO | WO 2018137888 | 8/2018 |

OTHER PUBLICATIONS

Haykin M. and Warnar, R., "Smart Card Technology: New Methods for Computer Access Control," Computer Science and Technology NIST Special Publication 500-157:1-60 (1988).

Lehpamer, Harvey, "Component of the RFID System," RFID Design Principles, 2nd edition pp. 133-201 (2012).

Pourghomi, Pardis et al., "A Proposed NFC Payment Application," International Journal of Advanced Computer Science and Applications, vol. 4, No. 8 (2013).

Author Unknown, "CardrefresherSM from American Express®," [online] 2019 [retrieved on Mar. 25, 2019]. Retrieved from Internet URL: https://merchant-channel.americanexpress.com/merchant/en_US/cardrefresher, 2 pages.

Author Unknown, "Add Account Updater to your recurring payment tool," [online] 2018-19 [retrieved on Mar. 25, 2019]. Retrieved from Internet URL: https://www.authorize.net/our-features/account-updater/, 5 pages.

Author Unknown, "Visa® Account Updater for Merchants," [online] 2019 [retrieved on Mar. 25, 2019]. Retrieved from Internet URL: https://usa.visa.com/dam/VCOM/download/merchants/visa-account-updater-product-information-fact-sheet-for-merchants.pdf, 2 pages.

Author Unknown, "Manage the cards that you use with Apple Pay," Apple Support [online] 2019 [retrieved on Mar. 25, 2019]. Retrieved from Internet URL: https://support.apple.com/en-us/HT205583, 5 pages.

Author Unknown, "Contactless Specifications for Payment Systems," EMV Book B—Entry Point Specification [online] 2016 [retrieved on Mar. 25, 2019]. Retrieved from Internet URL: https://www.emvco.com/wp-content/uploads/2017/05/BookB_Entry_Point_Specification_v2_6_20160809023257319.pdf, 52 pages.

Author Unknown, "EMV Integrated Circuit Card Specifications for Payment Systems, Book 2, Security and Key Management," Version 3.4, [online] 2011 [retrieved on Mar. 25, 2019]. Retrieved from Internet URL: https://www.emvco.com/wp-content/uploads/2017/

(56) References Cited

OTHER PUBLICATIONS

05/EMV_v4.3_Book_2_Security_and_Key_Management_20120607061923900.pdf, 174 pages.

Author unknown, "NFC Guide: All You Need to Know About Near Field Communication" Square Guide [online] 2018 [retrieved on Nov. 13, 2018]. Retrieved from Internet URL: https://squareup.com/guides/nfc, 8 pages.

Profis, S., "Everything you need to know about NFC and mobile payments" CNET Directory [online], 2014 [retrieved on Mar. 25, 2019]. Retrieved from the Internet URL: https://www.cnet.com/how-to/how-nfc-works-and-mobile-payments/, 6 pages.

Cozma, N., "Copy data from other devices in Android 5.0 Lollipop setup" CNET Directory [online] 2014 [retrieved on Mar. 25, 2019]. Retrieved from the Internet URL: https://www.cnet.com/how-to/copy-data-from-other-devices-in-android-5-0-lollipop-setup/, 5 pages.

Kevin, Android Enthusiast, "How to copy text string from nfc tag" StackExchange [online] 2013 [retrieved on Mar. 25, 2019]. Retrieved from the Internet URL: https://android.stackexchange.com/questions/55689/how-to-copy-text-string-from-nfc-tag, 11 pages.

Author unknown, "Tap & Go Device Setup" Samsung [online] date unknown [retrieved on Mar. 25, 2019]. Retrieved from the Internet URL: https://www.samsung.com/us/switch-me/switch-to-the-galaxy-s-5/app/partial/setup-device/tap-go.html, 1 page.

Author Unknown, "Multiple encryption", Wikipedia [online] 2019 [retrieved on Mar. 25, 2019]. Retrieved from Internet URL: https://en.wikipedia.org/wiki/Multiple_encryption, 4 pages.

Krawczyk, et al., "HMAC: Keyed-Hashing for Message Authentication", Network Working Group RFC:2104 memo [online] 1997 [retrieved on Mar. 25, 2019]. Retrieved from Internet URL: https://tools.ietf.org/html/rfc2104, 12 pages.

Song, et al., "The AES-CMAC Algorithm", Network Working Group RFC: 4493 memo [online] 2006 [retrieved on Mar. 25, 2019]. Retrieved from Internet URL: https://tools.ietf.org/html/rfc4493, 21 pages.

Katz, J., and Lindell, Y., "Aggregate Message Authentication Codes", Topics in Cryptology [online] 2008 [retrieved on Mar. 25, 2019]. Retrieved from Internet URL: https://www.cs.umd.edu/~jkatz/papers/aggregateMAC.pdf, 11 pages.

Adams, D., and Maier, A-K, "Goldbug Big Seven open source crypto-messengers to be compared-: or Comprehensive Confidentiality Review & Audit of GoldBug Encrypting E-Mail-Client & Secure Instant Messenger", Big Seven Study 2016 [online] [retrieved on Mar. 25, 2018]. Retrieved from Internet URL: https://sf.net/projects/goldbug/files/bigseven-crypto-audit.pdf, 309 pages.

Author Unknown, "Triple DES", Wikipedia [online] 2018 [retrieved on Mar. 25, 2019]. Retrieved from Internet URL: https://simple.wikipedia.org/wiki/Triple_DES, 2 pages.

Song, F., and Yun, A.1, "Quantum Security of NMAC and Related Constructions—PRF domain extension against quantum attacks", IACR Cryptology ePrint Archive [online] 2017 [retrieved on Mar. 25, 2019]. Retrieved from Internet URL: https://eprint.iacr.org/2017/509.pdf, 41 pages.

Saxena, N., "Lecture 10: NMAC, HMAC and Number Theory", CS 6903 Modern Cryptography [online] 2008 [retrieved on Mar. 25, 2019]. Retrieved from Internet URL: http://isis.poly.edu/courses/cs6903/Lectures/lecture10.pdf, 8 pages.

Berg, Guy, "Fundamentals of EMV" Smart Card Alliance [online] date unknown [retrieved on Mar. 27, 2019]. Retrieved from Internet URL: https://www.securetechalliance.org/resources/media/scap13_preconference/02.pdf, 37 pages.

Pierce, Kevin, "Is the amazon echo NFC compatible,?" Amazon.com Customer Q&A [online] 2016 [retrieved on Mar. 26, 2019]. Retrieved from Internet URL: https://www.amazon.com/ask/questions/Tx1RJXYSPE6XLJD ?_encodi . . . , 2 pages.

Author Unknown, "Multi-Factor Authentication", idaptive [online] 2019 [retrieved on Mar. 25, 2019]. Retrieved from Internet URL: https://www.centrify.com/products/application-services/adaptive-multi-factor-authentication/risk-based-mfa/, 10 pages.

Author Unknown, "Adaptive Authentication", SecureAuth [online] 2019 [retrieved on Mar. 25, 2019}. Retrieved from Internet URL: https://www.secureauth.com/products/access-management/adaptive-authentication, 7 pages.

Van den Breekel, J., et al., "EMV in a nutshell", Technical Report, 2016 [retrieved on Mar. 25, 2019]. Retrieved from Internet URL: https://www.cs.ru.nl/E.Poll/papers/EMVtechreport.pdf, 37 pages.

Author Unknown, "Autofill", Computer Hope [online] 2018 [retrieved on Mar. 25, 2019]. Retrieved from Internet URL: https://www.computerhope.com/jargon/a/autofill.htm, 2 pages.

Author Unknown, "Fill out forms automatically", Google Chrome Help [online] 2019 [retrieved on Mar. 25, 2019]. Retrieved from Internet URL: https://support.google.com/chrome/answer/142893?co=GENIE.Platform%3DDesktop&hl=en, 3 pages.

Author unknown, "Autofill credit cards, contacts, and passwords in Safari on Mac", Apple Safari User Guide [online] 2019 [retrieved on Mar. 25, 2019]. Retrieved from Internet URL: https://support.apple.com/guide/safari/use-autofill-ibrw1103/mac, 3 pages.

Menghin, M.J., "Power Optimization Techniques for Near Field Communication Systems" 2014 Dissertation at Technical University of Graz [online]. Retrieved from Internet URL: https://diglib.tugraz.at/download.php?id=576a7b910d2d6&location=browse, 135 pages.

Mareli, M., et al., "Experimental evaluation of NFC reliability between an RFID tag and a smartphone" Conference paper (2013) IEEE AFRICON At Mauritius [online] [retrieved on Mar. 25, 2019]. Retrieved from Internet URL: https://core.ac.uk/download/pdf/54204839.pdf, 5 pages.

Davison, A., et al., "MonoSLAM: Real-Time Single Camera Slam", IEEE Transactions on Pattern Analysis and Machine Intelligence 29(6): 1052-1067 (2007).

Barba, R., "Sharing your location with your bank sounds creepy, but it's also useful", Bankrate, LLC [online] 2017 [retrieved on Mar. 25, 2019]. Retrieved from Internet URL: https://www.bankrate.com/banking/banking-app-location-sharing/, 6 pages.

Author unknown: "onetappaymentTM", [online] Jan. 24, 2019, [retrieved on Mar. 25, 2019]. Retrieved from Internet URL: https://www.payubiz.in/onetap, 4 pages.

Vu et al., (2012). "Distinguishing users with capacitive touch communication" Proceedings of the Annual International Conference on Mobile Computing and Networking, MOBICOM. 10.1145/2348543.2348569.

EMVCo, EMV Card Personalization Specification, version 1.0 (Jun. 2003), 81 pages.

Ullmann et al., (2012). "On-Card" User Authentication for Contactless Smart Cards based on Gesture Recognition, LNI, 223-234, 12 pages.

Faraj et al. (2008). "Investigation of Java Smart Card Technology for Multi-Task Applications" J. of Al-Anbar University for Pure Science, vol. 2: No. 1: 2008, 11 pages.

Dhamdhere (2017) "Key Benefits of a Unified Platform for Loyalty, Referral Marketing, and UGC" Annex Cloud [retrieved on Jul. 3, 2019]. Retrieved from Internet URL: https://www.annexcloude.com/blog/benefits-unified-platform/, 13 pages.

* cited by examiner

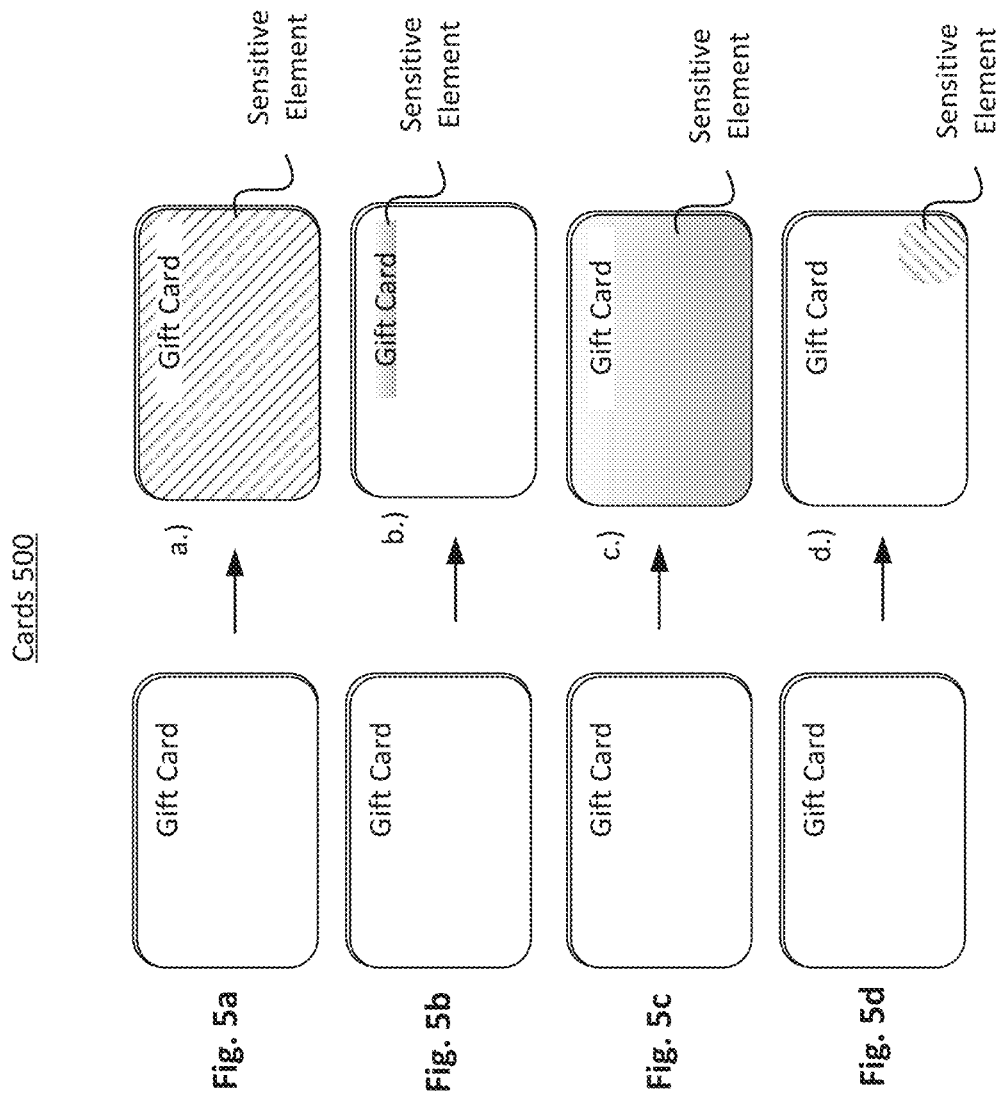

CARD WITH A TIME-SENSITIVE ELEMENT AND SYSTEMS AND METHODS FOR IMPLEMENTING THE SAME

FIELD OF THE DISCLOSURE

The present disclosure relates to a card with a sensitive element that, once activated, gradually changes over time.

BACKGROUND

Transaction cards account for a large portion of electronic commercial transactions. Often transactions cards may be subject to time constraints, such as fraud protection and promotions. However, users may have difficulty keeping track of the expiration of the time constraints associated with transaction cards.

As an example, gift cards are among the simplest and easiest gifts. Although most gift cards expire after a certain date, many gift card users forget when exactly their gift cards will expire. Many users often stow their gift cards away in their wallet or household and forget to check its expiry date. They unknowingly let their cards expire, thus missing the opportunity to make a purchase.

Therefore, there is a need to provide a transaction card that more clearly alerts the user to an expiration associated with the card.

SUMMARY OF THE DISCLOSURE

Embodiments of the present disclosure provide a card with a sensitive element. The card comprises a body comprising a substrate and a sensitive element with a predetermined lifespan. The sensitive element is configured to begin the predetermined lifespan at a starting event and finish the predetermined lifespan after a predetermined lifespan has passed.

Embodiments of the present disclosure provide a system for activating a time sensitive card, the system comprising a card further comprising a body further comprising a substrate and a sensitive element with a predetermined lifespan, the lifespan configured to begin at a starting event and to finish after a predetermined time period has passed. The system further includes a data storage unit configured to store at least the date when the card has experienced a starting event and the money associated with the card. The system further includes a merchant device configured to activate the sensitive element, trigger the starting event, and record, upon triggering the starting event, at least the date when the card has experienced a starting event and the money associated with the card in the data storage unit.

Embodiments of the present disclosure provide a method for recording the activation of a time-sensitive card, the method comprising the steps of providing a card comprising a body further comprising a substrate, and a sensitive element with a predetermined lifespan, the lifespan configured to begin at a starting event and to finish after a predetermined time period has passed. The method proceeds with activating the sensitive element, triggering the starting event, and recording, upon triggering the starting event, at least the date when the card has experienced a starting event and the money associated with the card in the data storage unit.

Further features of the disclosed systems and methods, and the advantages offered thereby, are explained in greater detail hereinafter with reference to specific example embodiments illustrated in the accompanying drawings.

BRIEF DESCRIPTION OF THE DRAWINGS

In order to facilitate a fuller understanding of the present invention, reference is now made to the attached drawings. The drawings should not be construed as limiting the present invention, but are intended only to illustrate different aspects and embodiments of the invention.

FIGS. 5a-5d are diagrams illustrating cards with a sensitive element according to exemplary embodiments.

DETAILED DESCRIPTION

Figure 1:
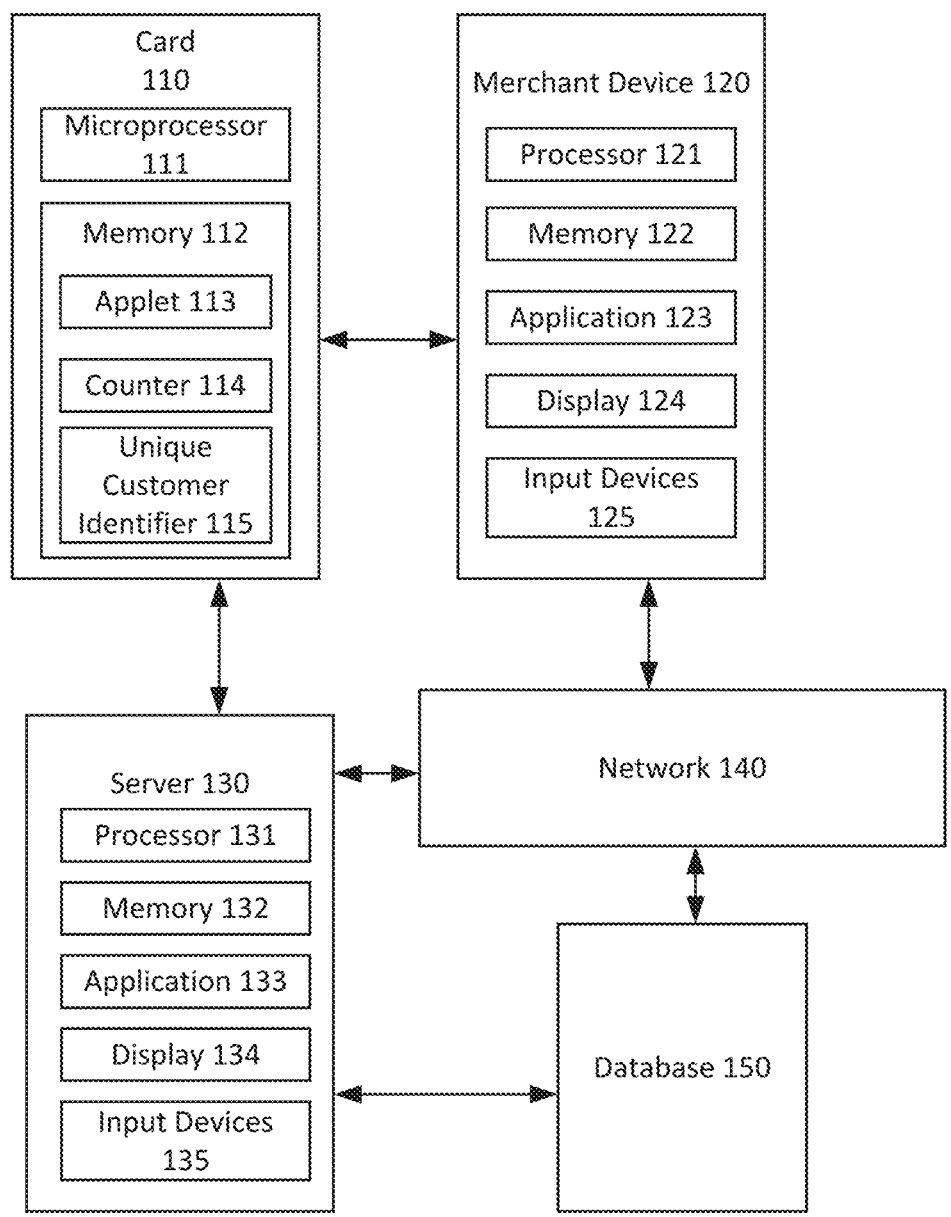
FIG. 1 is a block diagram illustrating a system according to an exemplary embodiment.

Exemplary embodiments of the invention will now be described in order to illustrate various features of the invention. The embodiments described herein are not intended to be limiting as to the scope of the invention, but rather are intended to provide examples of the components, use, and operation of the invention.

Furthermore, the described features, advantages, and characteristics of the embodiments may be combined in any suitable manner. One skilled in the relevant art will recognize that the embodiments may be practiced without one or more of the specific features or advantages of an embodiment. In other instances, additional features and advantages may be recognized in certain embodiments that may not be present in all embodiments. One skilled in the relevant art will understand that the described features, advantages, and characteristics of any embodiment can be interchangeably combined with the features, advantages, and characteristics of any other embodiment.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention relates generally to a time sensitive element on a card. The sensitive element on the card will change visually over time, thus communicating to the owner that the card is approaching its expiration. The sensitive element can be prominently displayed on the card so that the user can simply glance at the card to determine whether the card will soon expire.

For example, the sensitive element can cover an entire face of the card, a small corner of the card, the magnetic stripe of card, or somewhere else on the card. As the card approaches its expiration data, the sensitive element can visually change from its first configuration to a second configuration. For example, the sensitive element can change gradually from a blue color to a red color. The more red the sensitive element becomes, the closer the card is to the expiration date. Rather than look at and record the literal expiration date, the customer can simply view how "red" the card has become. For users who have color blindness, the sensitive element can change form a lighter color to a darker color. In other embodiments, the operative element of the card can change. For example, the sensitive element of the card can be the magnetic stripe. Upon being activated, the sensitive element can slowly but gradually fade away. Eventually, the magnetic stripe will fade so much that the card will not be operative. Thus, the user can look at the magnetic stripe to see whether the card is approaching its expiration date.

To activate the sensitive element, a starting event be performed on the card. For example, the starting event could be an electronic or magnetic activation of the sensitive element. The activation can be performed when the gift card is first swiped at a card reader or merchant device. As another example, the sensitive element can be activated by ultraviolet (UV) or photoelectric light. In other embodiments, the sensitive element can include microspheres which can change in color when acted upon by a chemical, magnetic field, temperature change, or physical force.

Once activated, the sensitive element has a predetermined time period to transition from a first visual element to a second visual element. The duration of the sensitive element—e.g. how long it takes for the sensitive element to transition from blue to red—can be predetermined by the composition of the sensitive element. Without limitation, the sensitive element can comprise UV-sensitive ink, temperature-sensitive ink, pressure-sensitive microspheres, UV-sensitive microsphere, temperature-sensitive microspheres, a biodegradable material, an electronic- or magnetic-sensitive material, or some material that can degrade gradually. In other embodiments, the activation of the sensitive element can occur by oxidation of one or more chemicals in microspheres on the card. For example, the sensitive element may be initially protected from the atmosphere by a rubber envelope, sticker, and/or rubber cement, which can, for example, seal atmospheric oxygen from the sensor zone. In other embodiments, the sensitive element can be a conductive polymer fuse that can be activated by an electronic or magnetic force. By making the sensitive element out of a chemical composition with a fixed half-life, the card avoids the problem of needing an electric charge to power the sensitive element.

FIG. 1 illustrates a system 100 according to an example embodiment. The system 100 may comprise a contactless card 110, a merchant device 120, a server 130, a network 140, and a database 150. Although FIG. 1 illustrates single instances of components of system 100, system 100 may include any number of components.

System 100 may include one or more contactless cards 110 which are further explained below with reference to FIG. 2 and FIG. 3. In some embodiments, contactless card 110 may be in wireless communication, utilizing near field communication (NFC) in an example, with merchant device 120.

System 100 may include a merchant device 120. The merchant device 120 may be a network-enabled computer device. Exemplary network-enabled computer devices include, without limitation, a server, a network appliance, a personal computer, a workstation, a phone, a handheld personal computer, a personal digital assistant, a thin client, a fat client, an Internet browser, a mobile device, a kiosk, a contactless card, an automatic teller machine (ATM), or other a computer device or communications device. For example, network-enabled computer devices may include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device.

The merchant device 120 may include a processor 121, a memory 122, and an application 123. The processor 121 may be a processor, a microprocessor, or other processor, and the merchant device 120 may include one or more of these processors. The processor 121 may include processing circuitry, which may contain additional components, including additional processors, memories, error and parity/CRC checkers, data encoders, anti-collision algorithms, controllers, command decoders, security primitives and tamper-proofing hardware, as necessary to perform the functions described herein.

The processor 121 may be coupled to the memory 122. The memory 122 may be a read-only memory, write-once read-multiple memory or read/write memory, e.g., RAM, ROM, and EEPROM, and the merchant device 120 may include one or more of these memories. A read-only memory may be factory programmable as read-only or one-time programmable. One-time programmability provides the opportunity to write once then read many times. A write-once read-multiple memory may be programmed at a point in time after the memory chip has left the factory. Once the memory is programmed, it may not be rewritten, but it may be read many times. A read/write memory may be programmed and re-programed many times after leaving the factory. It may also be read many times. The memory 122 may be configured to store one or more software applications, such as the application 123, and other data, such as user's private data and financial account information.

The application 123 may comprise one or more software applications, such as a mobile application and a web browser, comprising instructions for execution on the merchant device 120. In some examples, the merchant device 120 may execute one or more applications, such as software applications, that enable, for example, network communications with one or more components of the system 100, transmit and/or receive data, and perform the functions described herein. Upon execution by the processor 121, the application 123 may provide the functions described in this specification, specifically to execute and perform the steps and functions in the process flows described below. Such processes may be implemented in software, such as software modules, for execution by computers or other machines. The application 123 may provide graphical user interfaces (GUIs) through which a user may view and interact with other components and devices within the system 100. The GUIs may be formatted, for example, as web pages in HyperText Markup Language (HTML), Extensible Markup Language (XML) or in any other suitable form for presentation on a display device depending upon applications used by users to interact with the system 100.

The merchant device 120 may further include a display 124 and input devices 125. The display 124 may be any type of device for presenting visual information such as a computer monitor, a flat panel display, and a mobile device screen, including liquid crystal displays, light-emitting diode displays, plasma panels, and cathode ray tube displays. The input devices 125 may include any device for entering information into the merchant device 120 that is available and supported by the merchant device 120, such as a touch-screen, keyboard, mouse, cursor-control device, touch-screen, microphone, digital camera, video recorder or camcorder. These devices may be used to enter information and interact with the software and other devices described herein.

System 100 may include a server 130. The server 130 may be a network-enabled computer device. Exemplary network-enabled computer devices include, without limitation, a server, a network appliance, a personal computer, a workstation, a phone, a handheld personal computer, a personal digital assistant, a thin client, a fat client, an Internet browser, a mobile device, a kiosk, a contactless card, or other a computer device or communications device. For example, network-enabled computer devices may include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device.

The server 130 may include a processor 131, a memory 132, and an application 133. The processor 131 may be a processor, a microprocessor, or other processor, and the server 130 may include one or more of these processors. The processor 131 may include processing circuitry, which may contain additional components, including additional processors, memories, error and parity/CRC checkers, data encoders, anti-collision algorithms, controllers, command decoders, security primitives and tamper-proofing hardware, as necessary to perform the functions described herein.

The processor 131 may be coupled to the memory 132. The memory 132 may be a read-only memory, write-once read-multiple memory or read/write memory, e.g., RAM, ROM, and EEPROM, and the server 130 may include one or more of these memories. A read-only memory may be factory programmable as read-only or one-time programmable. One-time programmability provides the opportunity to write once then read many times. A write-once read-multiple memory may be programmed at a point in time after the memory chip has left the factory. Once the memory is programmed, it may not be rewritten, but it may be read many times. A read/write memory may be programmed and re-programed many times after leaving the factory. It may also be read many times. The memory 132 may be configured to store one or more software applications, such as the application 133, and other data, such as user's private data and financial account information.

The application 133 may comprise one or more software applications comprising instructions for execution on the server 130. In some examples, the server 130 may execute one or more applications, such as software applications, that enable, for example, network communications with one or more components of the system 100, transmit and/or receive data, and perform the functions described herein. Upon execution by the processor 131, the application 133 may provide the functions described in this specification, specifically to execute and perform the steps and functions in the process flows described below. For example, the application 133 may be executed to perform receiving web form data from the merchant device 120 and the card 110, retaining a web session between the merchant device 120 and the card 110, and masking private data received from the merchant device 120 and the card 110. Such processes may be implemented in software, such as software modules, for execution by computers or other machines. The application 133 may provide GUIs through which a user may view and interact with other components and devices within the system 100. The GUIs may be formatted, for example, as web pages in HyperText Markup Language (HTML), Extensible Markup Language (XML) or in any other suitable form for presentation on a display device depending upon applications used by users to interact with the system 100.

The server 130 may further include a display 134 and input devices 135. The display 134 may be any type of device for presenting visual information such as a computer monitor, a flat panel display, and a mobile device screen, including liquid crystal displays, light-emitting diode displays, plasma panels, and cathode ray tube displays. The input devices 135 may include any device for entering information into the server 130 that is available and supported by the server 130, such as a touch-screen, keyboard, mouse, cursor-control device, touch-screen, microphone, digital camera, video recorder or camcorder. These devices may be used to enter information and interact with the software and other devices described herein.

System 100 may include one or more networks 140. In some examples, the network 140 may be one or more of a wireless network, a wired network or any combination of wireless network and wired network, and may be configured to connect the merchant device 120, the server 130, the database 150 and the card 110. For example, the network 140 may include one or more of a fiber optics network, a passive optical network, a cable network, an Internet network, a satellite network, a wireless local area network (LAN), a Global System for Mobile Communication, a Personal Communication Service, a Personal Area Network, Wireless Application Protocol, Multimedia Messaging Service, Enhanced Messaging Service, Short Message Service, Time Division Multiplexing based systems, Code Division Multiple Access based systems, D-AMPS, Wi-Fi, Fixed Wireless Data, IEEE 802.11b, 802.15.1, 802.11n and 802.11g, Bluetooth, NFC, Radio Frequency Identification (RFID), Wi-Fi, and/or the like.

In addition, the network 140 may include, without limitation, telephone lines, fiber optics, IEEE Ethernet 902.3, a wide area network, a wireless personal area network, a LAN, or a global network such as the Internet. In addition, the network 140 may support an Internet network, a wireless communication network, a cellular network, or the like, or any combination thereof. The network 140 may further include one network, or any number of the exemplary types of networks mentioned above, operating as a stand-alone network or in cooperation with each other. The network 140 may utilize one or more protocols of one or more network elements to which they are communicatively coupled. The network 140 may translate to or from other protocols to one or more protocols of network devices. Although the network 140 is depicted as a single network, it should be appreciated that according to one or more examples, the network 140 may comprise a plurality of interconnected networks, such as, for example, the Internet, a service provider's network, a cable television network, corporate networks, such as credit card association networks, and home networks. The network 140 may further comprise, or be configured to create, one or more front channels, which may be publicly accessible and through which communications may be observable, and one or more secured back channels, which may not be publicly accessible and through which communications may not be observable.

System 100 may include a database 150. The database 150 may be one or more databases configured to store data, including without limitation, private data of users, financial accounts of users, identities of users, transactions of users, and certified and uncertified documents. The database 150 may comprise a relational database, a non-relational database, or other database implementations, and any combination thereof, including a plurality of relational databases and non-relational databases. In some examples, the database 150 may comprise a desktop database, a mobile database, or an in-memory database. Further, the database 150 may be hosted internally by the server 130 or may be hosted externally of the server 130, such as by a server, by a cloud-based platform, or in any storage device that is in data communication with the server 130.

In some examples, exemplary procedures in accordance with the present disclosure described herein can be performed by a processing arrangement and/or a computing arrangement (e.g., computer hardware arrangement). Such processing/computing arrangement can be, for example entirely or a part of, or include, but not limited to, a computer/processor that can include, for example one or more microprocessors, and use instructions stored on a non-transitory computer-accessible medium (e.g., RAM, ROM, hard drive, or other storage device). For example, a computer-accessible medium can be part of the memory of the contactless card 110, the merchant device 120, the server 130, the network 140, and the database 150 or other computer hardware arrangement.

In some examples, a computer-accessible medium (e.g., as described herein, a storage device such as a hard disk, floppy disk, memory stick, CD-ROM, RAM, ROM, etc., or a collection thereof) can be provided (e.g., in communication with the processing arrangement). The computer-accessible medium can contain executable instructions thereon. In addition or alternatively, a storage arrangement can be provided separately from the computer-accessible medium, which can provide the instructions to the processing arrangement so as to configure the processing arrangement to execute certain exemplary procedures, processes, and methods, as described herein above, for example.

Figure 2:
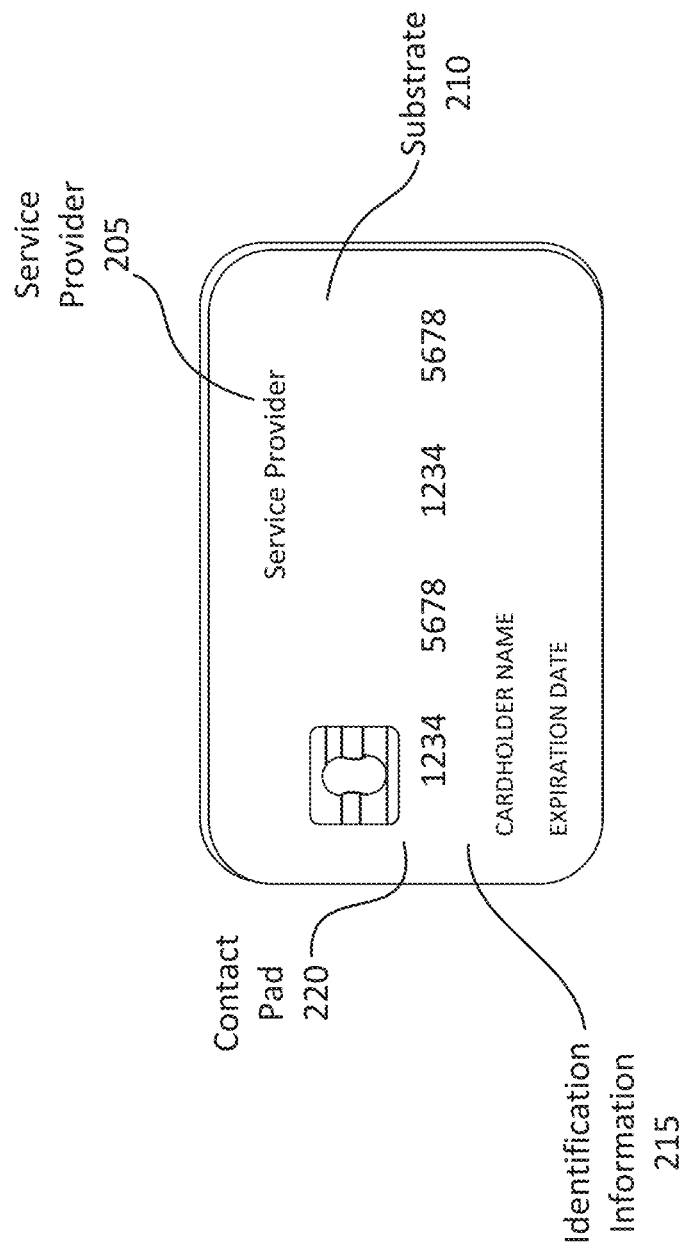
FIG. 2 is a diagram illustrating a contactless card according to an exemplary embodiment.

FIG. 2 illustrates a contactless card 200 according to an example embodiment. The contactless card 200 may comprise a payment card, such as a credit card, debit card, or gift card, issued by a service provider 205 displayed on the front or back of the card 200. In some examples, the payment card may comprise a dual interface contactless payment card. In some examples, the contactless card 200 is not related to a payment card, and may comprise, without limitation, an identification card, a membership card, a loyalty card, a transportation card, and a point of access card.

The contactless card 200 may comprise a substrate 210, which may include a single layer or one or more laminated layers composed of plastics, metals, and other materials. Exemplary substrate materials include polyvinyl chloride, polyvinyl chloride acetate, acrylonitrile butadiene styrene, polycarbonate, polyesters, anodized titanium, palladium, gold, carbon, paper, and biodegradable materials. In some examples, the contactless card 200 may have physical characteristics compliant with the ID-1 format of the ISO/IEC 7810 standard, and the contactless card may otherwise be compliant with the ISO/IEC 14443 standard. However, it is understood that the contactless card 200 according to the present disclosure may have different characteristics, and the present disclosure does not require a contactless card to be implemented in a payment card.

The contactless card 200 may also include identification information 215 displayed on the front and/or back of the card, and a contact pad 220. The contact pad 220 may be configured to establish contact with another communication device, such as a user device, smart phone, laptop, desktop, or tablet computer. The contactless card 200 may also include processing circuitry, antenna and other components not shown in FIG. 2. These components may be located behind the contact pad 220 or elsewhere on the substrate 210. The contactless card 200 may also include a magnetic strip or tape, which may be located on the back of the card (not shown in FIG. 2).

Figure 3:
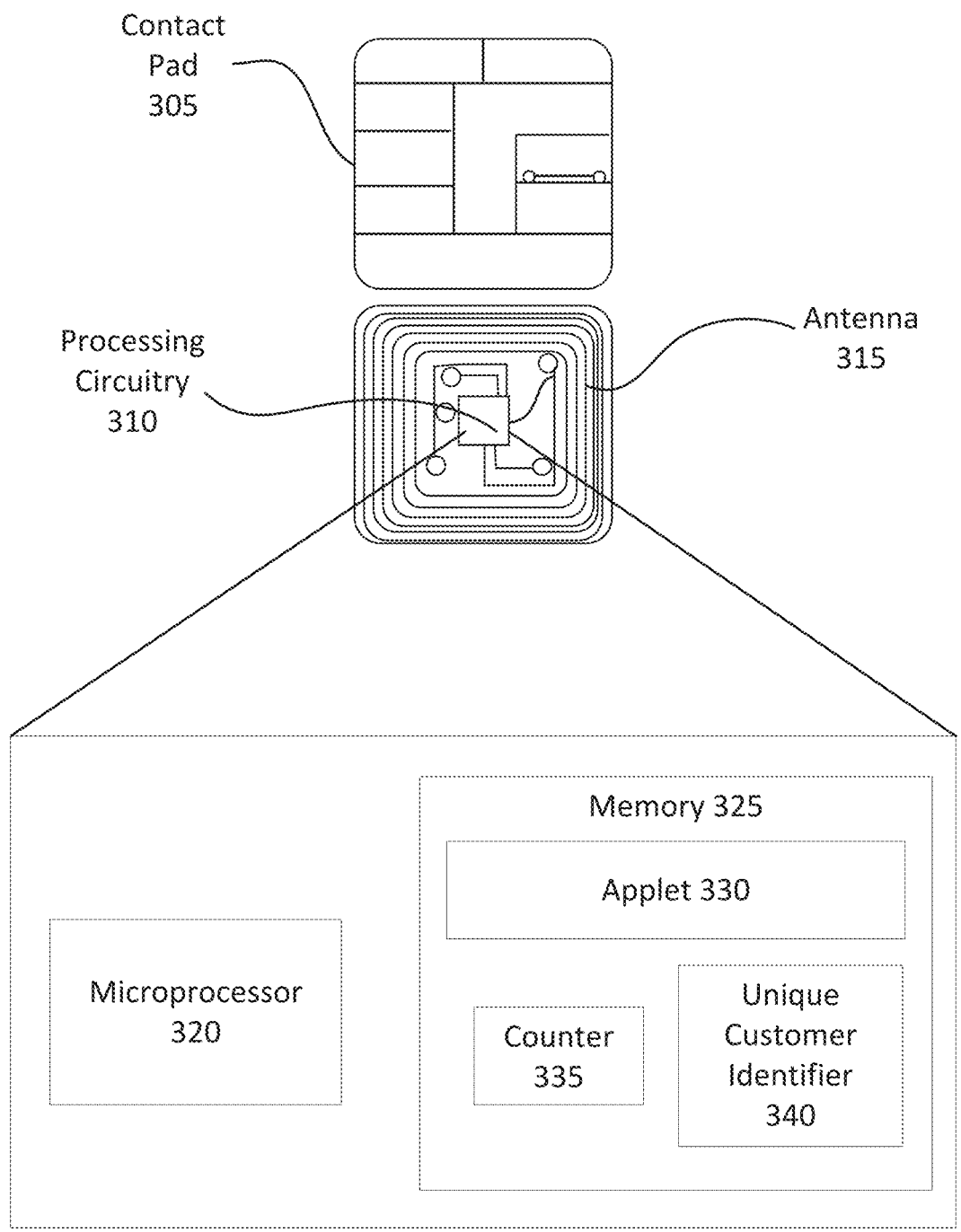
FIG. 3 is a diagram illustrating a contactless card according to an exemplary embodiment.

FIG. 3 illustrates a contactless card 200 according to an example embodiment.

As illustrated in FIG. 3, the contact pad 305 may include processing circuitry 310 for storing and processing information, including a microprocessor 320 and a memory 325. It is understood that the processing circuitry 310 may contain additional components, including processors, memories, error and parity/CRC checkers, data encoders, anticollision algorithms, controllers, command decoders, security primitives and tamperproofing hardware, as necessary to perform the functions described herein.

The memory 325 may be a read-only memory, write-once read-multiple memory or read/write memory, e.g., RAM, ROM, and EEPROM, and the contactless card 200 may include one or more of these memories. A read-only memory may be factory programmable as read-only or one-time programmable. One-time programmability provides the opportunity to write once then read many times. A write once/read-multiple memory may be programmed at a point in time after the memory chip has left the factory. Once the memory is programmed, it may not be rewritten, but it may be read many times. A read/write memory may be programmed and re-programed many times after leaving the factory. It may also be read many times.

The memory 325 may be configured to store one or more applets 330, one or more counters 335, and a customer identifier 340. The one or more applets 330 may comprise one or more software applications configured to execute on one or more contactless cards, such as Java Card applet. However, it is understood that applets 330 are not limited to Java Card applets, and instead may be any software application operable on contactless cards or other devices having limited memory. The one or more counters 335 may comprise a numeric counter sufficient to store an integer. The customer identifier 340 may comprise a unique alphanumeric identifier assigned to a user of the contactless card 200, and the identifier may distinguish the user of the contactless card from other contactless card users. In some examples, the customer identifier 340 may identify both a customer and an account assigned to that customer and may further identify the contactless card associated with the customer's account.

The processor and memory elements of the foregoing exemplary embodiments are described with reference to the contact pad, but the present disclosure is not limited thereto.

It is understood that these elements may be implemented outside of the pad 305 or entirely separate from it, or as further elements in addition to processor 320 and memory 325 elements located within the contact pad 305.

In some examples, the contactless card 200 may comprise one or more antennas 315. The one or more antennas 315 may be placed within the contactless card 200 and around the processing circuitry 310 of the contact pad 305. For example, the one or more antennas 315 may be integral with the processing circuitry 310 and the one or more antennas 315 may be used with an external booster coil. As another example, the one or more antennas 315 may be external to the contact pad 305 and the processing circuitry 310.

In an embodiment, the coil of contactless card 200 may act as the secondary of an air core transformer. The terminal may communicate with the contactless card 200 by cutting power or amplitude modulation. The contactless card 200 may infer the data transmitted from the terminal using the gaps in the contactless card's power connection, which may be functionally maintained through one or more capacitors. The contactless card 200 may communicate back by switching a load on the contactless card's coil or load modulation. Load modulation may be detected in the terminal's coil through interference.

As explained above, the contactless cards 200 may be built on a software platform operable on smart cards or other devices having limited memory, such as JavaCard, and one or more or more applications or applets may be securely executed. Applets may be added to contactless cards to provide a one-time password (OTP) for multifactor authentication (MFA) in various mobile application-based use cases. Applets may be configured to respond to one or more requests, such as near field data exchange requests, from a reader, such as a mobile NFC reader, and produce an NDEF message that comprises a cryptographically secure OTP encoded as an NDEF text tag.

Figure 4:
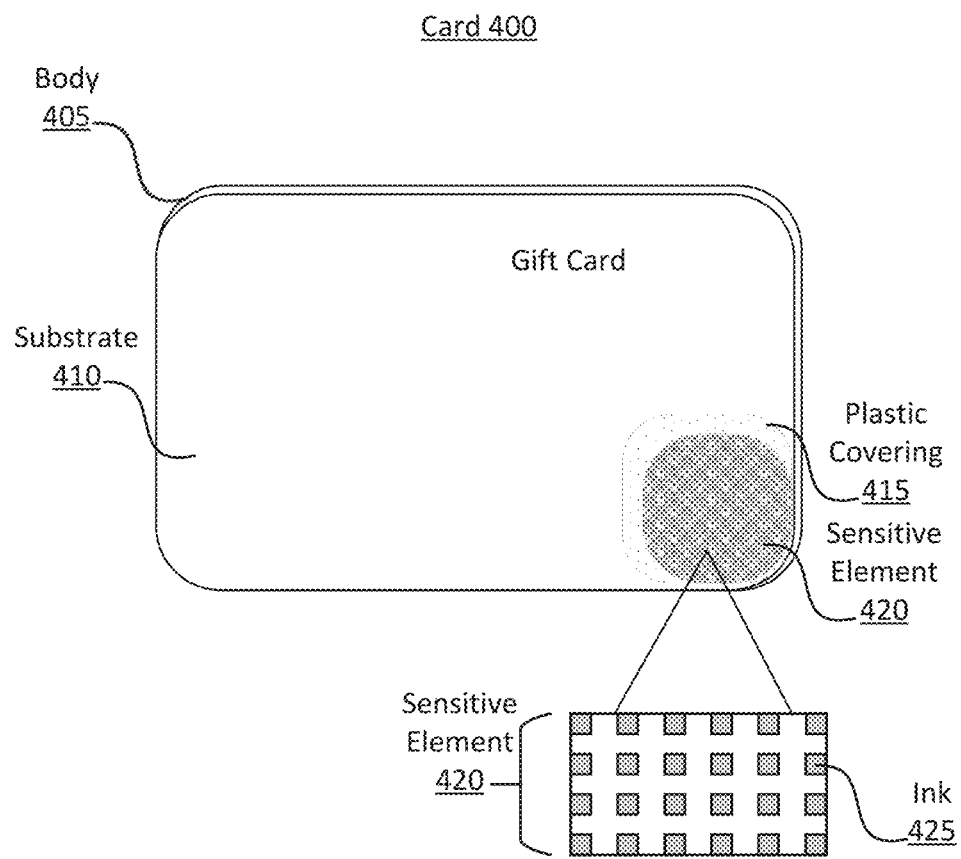
FIG. 4 is a diagram illustrating a card with a sensitive element according to an exemplary embodiment.

FIG. 4 is a diagram illustrating a card with a sensitive element according to an exemplary embodiment. The card may comprise a payment card, such as a credit card, debit card, or gift card, issued by a service provider displayed on the front or back of the card. In some examples, the payment card may comprise a dual interface contactless payment card. In some examples, the contactless card is not related to a payment card, and may comprise, without limitation, an identification card, a membership card, a loyalty card, a transportation card, and a point of access card.

The card may comprise a body 405 and a substrate 410, which may include a single layer or one or more laminated layers composed of plastics, metals, and other materials. Exemplary substrate materials include polyvinyl chloride, polyvinyl chloride acetate, acrylonitrile butadiene styrene, polycarbonate, polyesters, anodized titanium, palladium, gold, carbon, paper, and biodegradable materials. In some examples, the contactless card 400 may have physical characteristics compliant with the ID-1 format of the ISO/IEC 7810 standard, and the contactless card may otherwise be compliant with the ISO/IEC 14443 standard. However, it is understood that the contactless card 400 according to the present disclosure may have different characteristics, and the present disclosure does not require a contactless card to be implemented in a payment card.

On the substrate, there can be a plastic covering 415 over a sensitive element 420. The plastic element can be placed over the sensitive element to prevent the sensitive element from being triggered too early. When the user or merchant is ready to trigger the element, they can remove the plastic covering. In other embodiments, the plastic covering can cover more of the substrate including the entire face of the card. The covering can comprise other materials such as paper, metal, or biodegradable materials. In some embodiments, the plastic covering can be configured to block UV light or other light that could trigger the sensitive element. In other embodiments, the plastic covering can block electric signals and chemical signals from triggering the sensitive element. Without limitation, the sensitive element can comprise UV-sensitive ink, temperature-sensitive ink, pressure-sensitive microspheres, UV-sensitive microsphere, temperature-sensitive microspheres, a biodegradable material, an electronic- or magnetic-sensitive material, or some material that can degrade naturally upon being activated. Naturally degrading material can include organic matter or any matter than can breakdown as a result of biodegradation. The sensitive element 420 can comprise an element that is sensitive to light, temperature, electricity, pressure, or chemical. For example, the sensitive element can be triggered by an exposure to ultraviolet light, a certain high or low temperature (e.g. 120 degrees Fahrenheit), an electric current from a card reader, applied pressure from a user's hand or machine (e.g. 30 pounds of pressure), or by some swab of chemical (e.g. alcohol). It is understood that these are nonlimiting examples and that the sensitive elements can be activated by other means. The sensitive element can further comprise ink 425. The ink may comprise reflective ink, UV sensitive ink, temperature sensitive ink, or magnetic ink. It is understood that these examples are non-limiting and that other material and combinations thereof may constitute the ink. Although the pattern of ink in the sensitive element is represented as an ordered matrix of ink squares, it is understood that this is just one example of how the sensitive element can be configured. As another example, the sensitive element may comprise an unordered matrix of pixels, a watermark, or some other pattern. Once activated, the sensitive element can trigger its visual or tactile elements discussed with further reference to FIGS. 5a-5d. In other embodiments, the activation of the sensitive element can occur by oxidation of one or more chemicals in microspheres on the card. For example, the sensitive element may be initially protected from the atmosphere by a rubber envelope or sticker. In other embodiments, the sensitive element can be a conductive polymer fuse that can be activated by an electronic or magnetic force.

The sensitive element 420 can have a predetermined lifespan. The predetermined lifespan refers to some period of time across which the sensitive element will change from one form to another, visually or otherwise. The predetermined lifespan can be of any length. The predetermined lifespan can affect the visual aspects of the card or even the usefulness of the card (see e.g. FIG. 7). The predetermined lifespan can begin at one or more starting events such as a temperature change, card dip, card swipe, card tap, some other electronic moment, or some other starting event discussed elsewhere in the application.

FIGS. 5a-5d are diagrams illustrating card with sensitive elements. The sensitive element of the card can be one or both faces of the card. FIG. 5a illustrates a sensitive element that covers the entire face of the card except for the gift card title. The sensitive element comprises a pattern. Upon being triggered, the sensitive element can, over a predetermined time period, transition from a first stage to a second stage. The second stage can comprise a pattern, a color, a gradient, one or more symbols, any combination thereof, or some other visual element. FIG. 5a illustrates a sensitive element whose second stage is a pattern. Although FIG. 5a depicts a crisscross pattern, it is understood that pattern can include a number of other variations.

Without limitation, the sensitive element can comprise UV-sensitive ink, temperature-sensitive ink, pressure-sensitive microspheres, UV-sensitive microsphere, temperature-sensitive microspheres, a biodegradable material, an electronic- or magnetic-sensitive material, or some material that can degrade naturally upon being activated. Naturally degrading material can include organic matter or any matter than can breakdown as a result of biodegradation. The sensitive element can comprise an element that is sensitive to light, temperature, electricity, pressure, or chemical. For example, the sensitive element can be triggered by an exposure to ultraviolet light, a certain high or low temperature (e.g. 120 degrees Fahrenheit), an electric current from a card reader, applied pressure from a user's hand or machine (e.g. 30 pounds of pressure), or by some swab of chemical (e.g. alcohol). It is understood that these are nonlimiting examples and that the sensitive elements can be activated by other means. The sensitive element can further comprise ink. The ink may comprise reflective ink, UV sensitive ink, temperature sensitive ink, or magnetic ink. It is understood that these examples are non-limiting and that other material and combinations thereof may constitute the ink. Although the pattern of ink in the sensitive element is represented as an ordered matrix of ink squares, it is understood that this is just one example of how the sensitive element can be configured. As another example, the sensitive element may comprise an unordered matrix of pixels, a watermark, or some other pattern. Once activated, the sensitive element can trigger its visual or tactile elements discussed with further reference to FIGS. 5a-5d. In other embodiments, the activation of the sensitive element can occur by oxidation of one or more chemicals in microspheres on the card. For example, the sensitive element may be initially protected from the atmosphere by a rubber envelope or sticker. In other embodiments, the sensitive element can be a conductive polymer fuse that can be activated by an electronic or magnetic force.

The sensitive elements can have a predetermined lifespan. The predetermined lifespan refers to some period of time across which the sensitive element will change from one form to another, visually or otherwise. The predetermined lifespan can be of any length. The predetermined lifespan can affect the visual aspects of the card or even the usefulness of the card (see e.g. FIG. 7). The predetermined lifespan can begin at one or more starting events such as a temperature change, card dip, card swipe, card tap, some other electronic moment, or some other starting event discussed elsewhere in the application.

In FIGS. 5b and 5c, the second stage of the sensitive element is a color gradient. For example, the color gradient can continuously transition from a green to a blue color, the second stage being complete when the element turns entirely blue. FIG. 5b depicts the secure element located on the gift card title, and FIG. 5c depicts the secure element located on the entire face except for the gift card title.

FIG. 5d depicts the secure element covering only one corner of the face. In other embodiments, the secure element can cover any parts of the card's face.

The patterns and gradients in FIGS. 5a-5d can include additional variations not shown. For example, the sensitive element can be configured in the shape of a logo such as a brand logo or sports team logo. In other configurations, the sensitive element can be in the shape of a user's name, some words or phrases, or drawing. A card may have two sensitive elements that are both activated at the same time: the first sensitive element may fade over time, and the second sensitive element may become more visually clear or prominent over time.

Figure 6A:
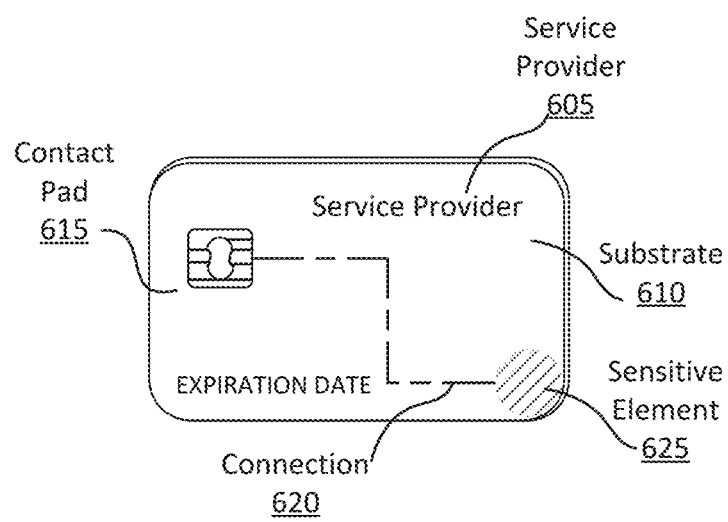
FIGS. 6a-6b are diagrams illustrating a card with a sensitive element activated by an electric charge according to exemplary embodiments.
Figure 6B:
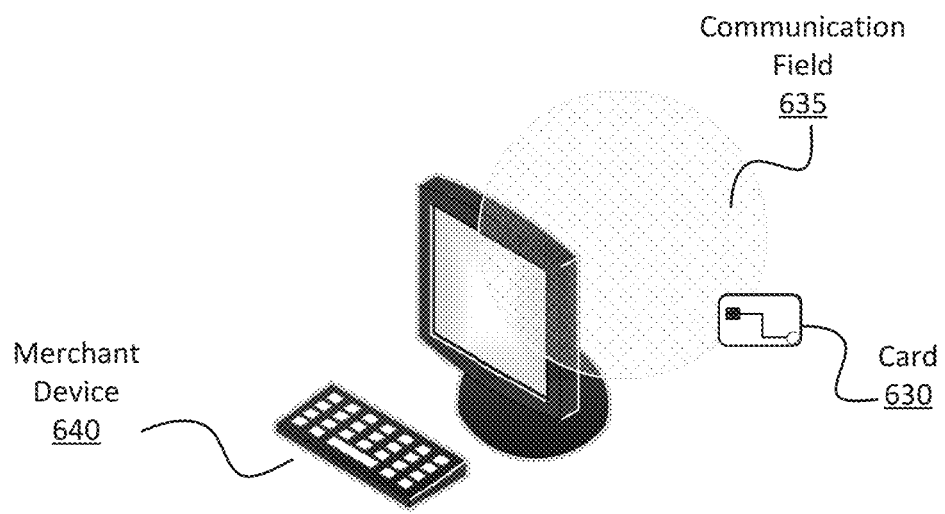

FIGS. 6a and 6b illustrate a contactless card with a sensitive element and its interaction with a device. FIG. 6a is an example of a card with contact pad. The card 600 may comprise a payment card, such as a credit card, debit card, or gift card, issued by a service provider 605 displayed on the front or back of the card 600. In some examples, the payment card may comprise a dual interface contactless payment card. In some examples, the card 600 is not related to a payment card, and may comprise, without limitation, an identification card, a membership card, a loyalty card, a transportation card, and a point of access card.

Without limitation, the sensitive element can comprise UV-sensitive ink, temperature-sensitive ink, pressure-sensitive microspheres, UV-sensitive microsphere, temperature-sensitive microspheres, a biodegradable material, an electronic- or magnetic-sensitive material, or some material that can degrade naturally upon being activated. Naturally degrading material can include organic matter or any matter than can breakdown as a result of biodegradation. The sensitive element can comprise an element that is sensitive to light, temperature, electricity, pressure, or chemical. For example, the sensitive element can be triggered by an exposure to ultraviolet light, a certain high or low temperature (e.g. 120 degrees Fahrenheit), an electric current from a card reader, applied pressure from a user's hand or machine (e.g. 30 pounds of pressure), or by some swab of chemical (e.g. alcohol). It is understood that these are nonlimiting examples and that the sensitive elements can be activated by other means. The sensitive element can further comprise ink. The ink may comprise reflective ink, UV sensitive ink, temperature sensitive ink, or magnetic ink. It is understood that these examples are non-limiting and that other material and combinations thereof may constitute the ink. Although the pattern of ink in the sensitive element is represented as an ordered matrix of ink squares, it is understood that this is just one example of how the sensitive element can be configured. As another example, the sensitive element may comprise an unordered matrix of pixels, a watermark, or some other pattern. Once activated, the sensitive element can trigger its visual or tactile elements discussed with further reference to FIGS. 5a-5d. In other embodiments, the activation of the sensitive element can occur by oxidation of one or more chemicals in microspheres on the card. For example, the sensitive element may be initially protected from the atmosphere by a rubber envelope or sticker. In other embodiments, the sensitive element can be a conductive polymer fuse that can be activated by an electronic or magnetic force.

The sensitive element can have a predetermined lifespan. The predetermined lifespan refers to some period of time across which the sensitive element will change from one form to another, visually or otherwise. The predetermined lifespan can be of any length. The predetermined lifespan can affect the visual aspects of the card or even the usefulness of the card (see e.g. FIG. 7). The predetermined lifespan can begin at one or more starting events such as a temperature change, card dip, card swipe, card tap, some other electronic moment, or some other starting event discussed elsewhere in the application.

The card 600 may comprise a substrate 610, which may include a single layer or one or more laminated layers composed of plastics, metals, and other materials. Exemplary substrate materials include polyvinyl chloride, polyvinyl chloride acetate, acrylonitrile butadiene styrene, polycarbonate, polyesters, anodized titanium, palladium, gold, carbon, paper, and biodegradable materials. Naturally degrading material can include organic matter or any matter than can breakdown as a result of biodegradation. In some examples, the card 600 may have physical characteristics compliant with the ID-1 format of the ISO/IEC 7810 standard, and the contactless card may otherwise be compliant with the ISO/IEC 14443 standard. However, it is understood that the card 600 according to the present disclosure may have different characteristics, and the present disclosure does not require a contactless card to be implemented in a payment card.

The card can also comprise a contact pad 615. The contact pad 615 may be configured to establish contact with another communication device, such as a user device, smart phone, laptop, desktop, or tablet computer. The card 600 may also include processing circuitry, antenna and other components not shown in FIG. 6. These components may be located behind the contact pad 615 or elsewhere on the substrate 610. The contact pad is discussed with further reference to FIGS. 2 and 3. The contactless card 600 may also include a magnetic strip or tape, which may be located on the back of the card (not shown in FIG. 6). The card can also include a sensitive element 625 discussed with further reference to FIGS. 4 and 5. There can be a connection 620 between the contact pad 615 and the sensitive element 625. The connection 620 may be comprised of a bus, contact pin connectors, wires, or other similar connection devices. The connection 620 can carry an electric charge between the contact pad 615 and the sensitive element 625 such that the electric charge triggers the sensitive element.

FIG. 6b depicts the card 630 interacting with a merchant device 640 over a communication field 635. In some examples, the card 630 can be the same card from FIG. 6a. The merchant device 640 can be network-enabled computer device. Exemplary network-enabled computer devices include, without limitation, a server, a network appliance, a personal computer, a workstation, a phone, a handheld personal computer, a personal digital assistant, a thin client, a fat client, an Internet browser, a mobile device, a kiosk, a contactless card, an automatic teller machine (ATM), or other a computer device or communications device. In some embodiments, the merchant device can be associated with a merchant, retailer, or other consumer-based establishment. The merchant device can open, by a processor, a communication field 635. The communication field can be NFC, Bluetooth, or RFID. Generally, NFC is the transmission of data through electromagnetic radio fields which enable two or more devices to communicate with each other without touching. NFC operates at 13.56 MHz on ISO/IEC 18000-3 air interface and at rates ranging from 106 kbit/s to 424 kbit/s.

Some examples of NFC communication include NFC card emulation where smartphones act like smart cards allowing users to perform transactions such as payment. As another example, NFC reader/writer communication allows devices to read information stored on NFC tags embedded into labels or smart posters. As another example, NFC peer-to-peer communication allows two NFC-enabled devices to communicate with each other to exchange information.

NFC standards cover communications protocols and data exchange formats, and are based on existing RFID standards including ISO/IEC 14443 and FeliCa. The standards include ISO/IEC 18092 and those defined by the NFC Forum.

Upon entering the communication field 635, the card 630 can receive a small electric charge from the merchant device 640. This electric charge can, from the contact pad via the connection, activate or trigger the sensitive element. In other embodiments, the sensitive element can be activated by an electric charge from a card or chip readers associated with the merchant device 640.

Figure 7:
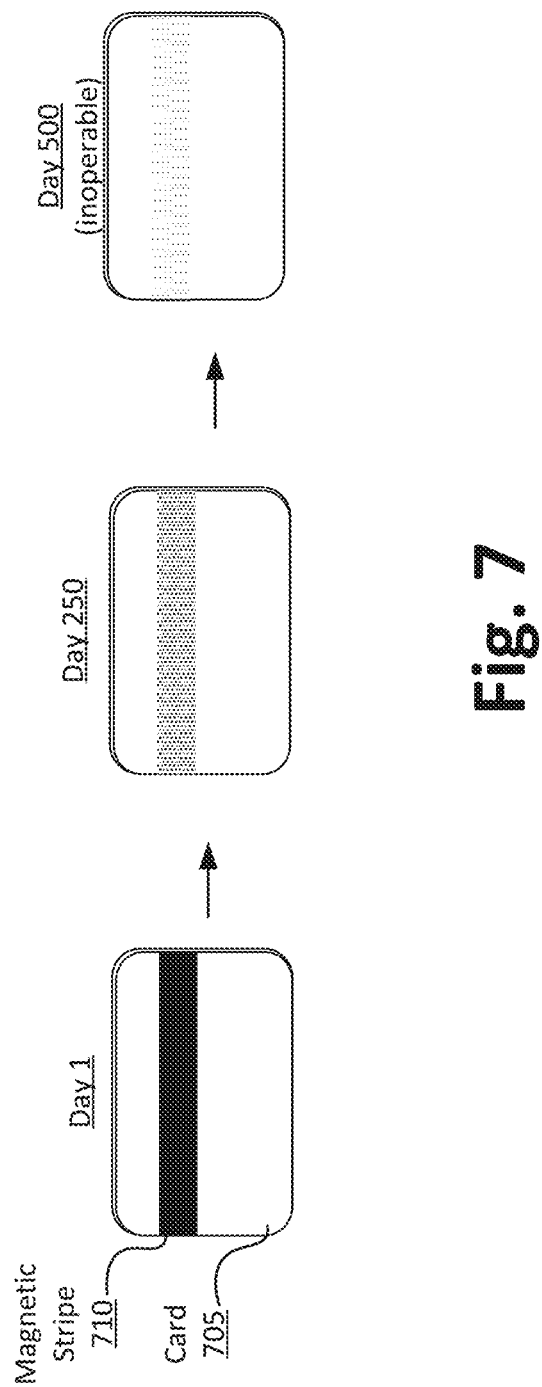
FIG. 7 is a diagram illustrating a card with a sensitive element as a magnetic stripe according to an exemplary embodiment.

FIG. 7 illustrates a gradually degrading magnetic strip. In some embodiments, the sensitive element can be directly tied to the operation of the card. That is, the operative part of the card degrades until that the card cannot function after a certain time period passes. In FIG. 7, a magnetic stripe card 705 is provisioned such that the magnetic stripe 710 is the sensitive element. The magnetic stripe card can be one of many types of cards, including but not limited to identification card, a membership card, a loyalty card, a gift card, a transportation card, and a point of access card. The magnetic stripe can contain one or more stacks of information including card account number, name, expiration date, service code, and card verification code. Magnetic stripe cards are generally used with card readers that can read the card upon being swiped.

Without limitation, the sensitive element can comprise UV-sensitive ink, temperature-sensitive ink, pressure-sensitive microspheres, UV-sensitive microsphere, temperature-sensitive microspheres, a biodegradable material, an electronic- or magnetic-sensitive material, or some material that can degrade naturally upon being activated. Naturally degrading material can include organic matter or any matter than can breakdown as a result of biodegradation. The sensitive element can comprise an element that is sensitive to light, temperature, electricity, pressure, or chemical. For example, the sensitive element can be triggered by an exposure to ultraviolet light, a certain high or low temperature (e.g. 120 degrees Fahrenheit), an electric current from a card reader, applied pressure from a user's hand or machine (e.g. 30 pounds of pressure), or by some swab of chemical (e.g. alcohol). It is understood that these are nonlimiting examples and that the sensitive elements can be activated by other means. The sensitive element can further comprise ink. The ink may comprise reflective ink, UV sensitive ink, temperature sensitive ink, or magnetic ink. It is understood that these examples are non-limiting and that other material and combinations thereof may constitute the ink. Although the pattern of ink in the sensitive element is represented as an ordered matrix of ink squares, it is understood that this is just one example of how the sensitive element can be configured. As another example, the sensitive element may comprise an unordered matrix of pixels, a watermark, or some other pattern. Once activated, the sensitive element can trigger its visual or tactile elements discussed with further reference to FIGS. 5a-5d. In other embodiments, the activation of the sensitive element can occur by oxidation of one or more chemicals in microspheres on the card. For example, the sensitive element may be initially protected from the atmosphere by a rubber envelope or sticker. In other embodiments, the sensitive element can be a conductive polymer fuse that can be activated by an electronic or magnetic force.

The sensitive element can have a predetermined lifespan. The predetermined lifespan refers to some period of time across which the sensitive element will change from one form to another, visually or otherwise. The predetermined lifespan can be of any length. The predetermined lifespan can affect the visual aspects of the card or even the usefulness of the card (see e.g. FIG. 7). The predetermined lifespan can begin at one or more starting events such as a temperature change, card dip, card swipe, card tap, some other electronic moment, or some other starting event discussed elsewhere in the application.

Once activated, the magnetic stripe degrades gradually. After a certain period of time, the magnetic stripe will become so degraded that a card reader will be unable to retrieve payment information from the card, thus rendering the card expired. On day 1, the sensitive element comprising the magnetic stripe is activated. Over time, the magnetic stripe will degrade or disappear gradually. For example, 250 days after triggering the sensitive element, the magnetic stripe will have degraded significantly but still be able to transmit information to a card reader. But after a longer period of time, the magnetic stripe will degrade so much that it cannot be read. For example, after 500 days the magnetic stripe will be inoperable. The user can see how much the magnetic stripe has degraded over time, thus giving them a visual cue that they have a limited time to use the card. To degrade over time, the magnetic strip can be composed a biodegradable material, conductive plastic, microsphere filled with one or more fluids or chemicals, an oxidizing chemical, and/or polymers.

In other embodiments, the magnetic stripe or some other operative part of the card could be delayed. That is, the sensitive element activates the operative part of the card rather than deactivates it. As an example, the sensitive element could be triggered. Upon being triggered, the sensitive element will activate the operative part of the card, e.g. the magnetic stripe, after six months. This ensures that the card is not used right away. A user can gift someone a card that they do not want to use until some time in the future. For example, a parent can give their child a gift card that activates around the summer time when school is out. Thus, the parent ensures that the child cannot spend the gift card before school ends.

Figure 8:
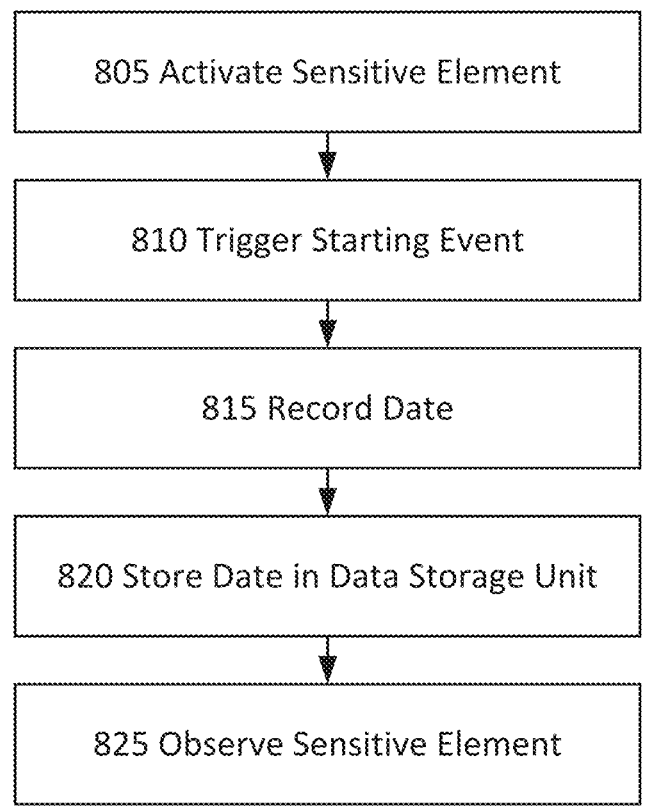
FIG. 8 is a diagram illustrating a method according to an exemplary embodiment according to an exemplary embodiment.

FIG. 8 is a method flowchart illustrating a process according to an exemplary embodiment. The method can begin with activating the sensitive element in action 805. The sensitive element can be located one or both of the card's faces or substrates. The sensitive element can cover the entire face or one or more parts of the face. Furthermore, the sensitive element can be covered by a plastic covering. It is understood that the covering can further comprise paper, metal, or some other thin material. The sensitive material can be activated in a number of ways: exposing the sensitive element to UV light; electricity; pressure; temperature; friction; chemicals; or some other activating event. The activation of the sensitive material can be accomplished by a UV light; a card reader; a communication field such as NFC, Bluetooth, or RFID; or some other device. Upon activating the sensitive element, in action 810 the starting event is triggered. The starting event starts the transformation of the sensitive element from a first stage to a second stage. The second stage indicates that the card is approaching or has already approached its expiration. The first stage gradually transforms into the second stage such that a user can easily notice when the card is approaching its expiration.

Without limitation, the sensitive element can comprise UV-sensitive ink, temperature-sensitive ink, pressure-sensitive microspheres, UV-sensitive microsphere, temperature-sensitive microspheres, a biodegradable material, an electronic- or magnetic-sensitive material, or some material that can degrade naturally upon being activated. Naturally degrading material can include organic matter or any matter than can breakdown as a result of biodegradation. The sensitive element can comprise an element that is sensitive to light, temperature, electricity, pressure, or chemical. For example, the sensitive element can be triggered by an exposure to ultraviolet light, a certain high or low temperature (e.g. 120 degrees Fahrenheit), an electric current from a card reader, applied pressure from a user's hand or machine (e.g. 30 pounds of pressure), or by some swab of chemical (e.g. alcohol). It is understood that these are nonlimiting examples and that the sensitive elements can be activated by other means. The sensitive element can further comprise ink. The ink may comprise reflective ink, UV sensitive ink, temperature sensitive ink, or magnetic ink. It is understood that these examples are non-limiting and that other material and combinations thereof may constitute the ink. Although the pattern of ink in the sensitive element is represented as an ordered matrix of ink squares, it is understood that this is just one example of how the sensitive element can be configured. As another example, the sensitive element may comprise an unordered matrix of pixels, a watermark, or some other pattern. Once activated, the sensitive element can trigger its visual or tactile elements discussed with further reference to FIGS. 5a-5d. In other embodiments, the activation of the sensitive element can occur by oxidation of one or more chemicals in microspheres on the card. For example, the sensitive element may be initially protected from the atmosphere by a rubber envelope or sticker. In other embodiments, the sensitive element can be a conductive polymer fuse that can be activated by an electronic or magnetic force.

The sensitive element can have a predetermined lifespan. The predetermined lifespan refers to some period of time across which the sensitive element will change from one form to another, visually or otherwise. The predetermined lifespan can be of any length. The predetermined lifespan can affect the visual aspects of the card or even the usefulness of the card (see e.g. FIG. 7). The predetermined lifespan can begin at one or more starting events such as a temperature change, card dip, card swipe, card tap, some other electronic moment, or some other starting event discussed elsewhere in the application.

The sensitive element can include a number of visual embodiments discussed with further reference to FIGS. 4-7. The sensitive elements can transform from a first color to a second color or from a first pattern to a second pattern. Additionally, the sensitive element can deteriorate over time such that a symbol, color, or pattern deteriorates visually as the sensitive element approaches its expiration. The sensitive element can deteriorate to reveal another symbol or visual cue to the user.

Upon triggering the starting event, in action 815 the date of the starting event can be recorded. This action can be performed by a processor associated with a user device or merchant device. For example, the user may scan, swipe, or tap the gift card with the user device to record the expiration date. As another example, the merchant can scan, swipe, or tap the gift card using a card reader, chip reader, or some other merchant device. The processor can record the date of the activation of the starting event and the expiration date. The dates can be stored in a database or data storage unit associated with the user device, merchant device, or some server. The server can be associated with the entity associated with the gift card. The server can store the activation data and the expiration date. Upon recording the start date, in action 820 the processor associated with the user device or merchant device can store the date in a data storage unit associated with the device or some other server. In some embodiments, the processor or some merchant server can track when the starting event has occurred and when the predetermined time period will end.

In some aspects, the techniques described herein relate to a card with a sensitive element, the card including a body further including: a substrate; and a sensitive element with a predetermined lifespan, wherein the sensitive element is configured to: begin the predetermined lifespan at a starting event, and finish the predetermined lifespan after a predetermined time period has passed.

In some aspects, the techniques described herein relate to a card, wherein the sensitive element includes at least an ultraviolet (UV) sensitive material.

In some aspects, the techniques described herein relate to a card, wherein the sensitive element includes at least an electrically sensitive material.

In some aspects, the techniques described herein relate to a card, wherein the sensitive element includes at least a temperature-sensitive material.

In some aspects, the techniques described herein relate to a card, wherein sensitive element includes a color-changing material, the color-changing material configured to be at least a first color at the starting event, and change gradually into at least a second color after a predetermined time period has passed.

In some aspects, the techniques described herein relate to a card, wherein the sensitive elements include a naturally degrading material.

In some aspects, the techniques described herein relate to a card, wherein starting event is an electronic action performed on the card.

In some aspects, the techniques described herein relate to a card, wherein the starting event is an exposure to at least one selected group of ultraviolet (UV) light and photoelectric light.

In some aspects, the techniques described herein relate to a card, wherein the starting event is a predetermined temperature change on the card.

In some aspects, the techniques described herein relate to a system for activating a time sensitive card, the system including: a card further including: a body further including: a substrate; and a sensitive element with a predetermined lifespan, wherein the sensitive element is configured to: begin the predetermined lifespan configured to begin at a starting event, and finish the predetermined lifespan after a predetermined time period has passed; a data storage unit configured to store at least a date when the card has experienced a starting event; and a merchant device configured to: activate the sensitive element; trigger the starting event; and record, upon triggering the starting event, the date when the card has experienced a starting event and a monetary amount associated with the card in the data storage unit.

In some aspects, the techniques described herein relate to a system, wherein the merchant device includes a card reader including at least a magnetic stripe reader, a near field communication (NFC) reader, and a radio-frequency identification (RFID) reader.

In some aspects, the techniques described herein relate to a system, wherein the card reader activates the sensitive element by electronically acting upon the card through a magnetic stripe reader, a near field communication (NFC) reader, and a radio-frequency identification (RFID) reader.

In some aspects, the techniques described herein relate to a system, wherein the system further includes a merchant server configured to track when the starting event has occurred and when the predetermined time period will end.

In some aspects, the techniques described herein relate to a system, wherein the card includes at least an ultraviolet (UV) sensitive material, an electrically sensitive material, and a temperature-sensitive material.

In some aspects, the techniques described herein relate to a system, wherein the card further includes at least one face on which the sensitive element is visible to a user associated with the card.

In some aspects, the techniques described herein relate to a system, wherein the sensitive element further includes microspheres filled with ink that is sensitive to UV light and temperature.

In some aspects, the techniques described herein relate to a system, wherein the sensitive element includes bioreactive chemicals.

In some aspects, the techniques described herein relate to a method for recording an activation of a time-sensitive card, the method including the steps of: providing a card including: a body further including: a substrate, and a sensitive element with a predetermined lifespan, wherein the sensitive element is configured to: begin the predetermined lifespan at a starting event, and finish the predetermined lifespan after a predetermined time period has passed; activating the sensitive element, triggering the starting event, and recording, upon triggering the starting event, at least a date when the card has experienced a starting event and a monetary amount associated with the card in a data storage unit.

In some aspects, the techniques described herein relate to a method, wherein the steps further include activating the sensitive element by at least electronically acting upon the card through at least one selected from the group of a magnetic stripe reader, a near field communication (NFC) reader, and a radio-frequency identification (RFID) reader.

In some aspects, the techniques described herein relate to a method, wherein the steps further include tracking when the starting event has occurred and when the predetermined time period will end.

As used herein, the terms "card" and "contactless card" are not limited to a particular type of card. Rather, it is understood that the term "card" can refer to a contact-based card, a contactless card, or any other card, unless otherwise indicated. It is further understood that the present disclosure is not limited to cards having a certain purpose (e.g., payment cards, gift cards, identification cards, or membership cards), to cards associated with a particular type of account (e.g., a credit account, a debit account, a membership account), or to cards issued by a particular entity (e.g., a financial institution, a government entity, or a social club). Instead, it is understood that the present disclosure includes cards having any purpose, account association, or issuing entity.

As used herein, user information, personal information, and sensitive information can include any information relating to the user, such as a private information and non-private information. Private information can include any sensitive data, including financial data (e.g., account information, account balances, account activity), personal information/personally-identifiable information (e.g., social security number, home or work address, birth date, telephone number, email address, passport number, driver's license number), access information (e.g., passwords, security codes, authorization codes, biometric data), and any other information that user may desire to avoid revealing to unauthorized persons. Non-private information can include any data that is publicly known or otherwise not intended to be kept private.

It is further noted that the systems and methods described herein may be tangibly embodied in one or more physical media, such as, but not limited to, a compact disc (CD), a digital versatile disc (DVD), a floppy disk, a hard drive, read only memory (ROM), random access memory (RAM), as well as other physical media capable of data storage. For example, data storage may include random access memory (RAM) and read only memory (ROM), which may be configured to access and store data and information and computer program instructions. Data storage may also include storage media or other suitable type of memory (e.g., such as, for example, RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives, and any type of tangible and non-transitory storage medium), where the files that comprise an operating system, application programs including, for example, web browser application, email application and/or other applications, and data files may be stored. The data storage of the network-enabled computer systems may include electronic information, files, and documents stored in various ways, including, for example, a flat file, indexed file, hierarchical database, relational database, such as a database created and maintained with software from, for example, Oracle® Corporation, Microsoft® Excel file, Microsoft® Access file, a solid state storage device, which may include a flash array, a hybrid array, or a server-side product, enterprise storage, which may include online or cloud storage, or any other storage mechanism. Moreover, the figures illustrate various components (e.g., servers, computers, processors, etc.) separately. The functions described as being performed at various components may be performed at other components, and the various components may be combined or separated. Other modifications also may be made.

Computer readable program instructions described herein can be downloaded to respective computing and/or processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing and/or processing device receives computer readable program instructions from the network and forwards the computer readable program instructions for storage in a computer readable storage medium within the respective computing and/or processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, to perform aspects of the present invention.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions specified herein. These computer-readable program instructions may also be stored in a computer-readable storage medium that can direct a computer, a programmable data processing apparatus, and/or other devices to function in a manner, such that the computer readable storage medium having instructions stored therein comprises an article of manufacture including instructions which implement aspects of the functions specified herein.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions specified herein.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application specific integrated circuit).

Although embodiments of the present invention have been described herein in the context of a particular implementation in a particular environment for a particular purpose, those skilled in the art will recognize that its usefulness is not limited thereto and that the embodiments of the present invention can be beneficially implemented in other related environments for similar purposes. The invention should therefore not be limited by the above described embodiments, method, and examples, but by all embodiments within the scope and spirit of the invention as claimed.

In the invention, various embodiments have been described with references to the accompanying drawings. It may, however, be evident that various modifications and changes may be made thereto, and additional embodiments may be implemented, without departing from the broader scope of the invention as set forth in the claims that follow. The invention and drawings are accordingly to be regarded in an illustrative rather than restrictive sense.

The invention is not to be limited in terms of the particular embodiments described herein, which are intended as illustrations of various aspects. Many modifications and variations can be made without departing from its spirit and scope. Functionally equivalent systems, processes and apparatuses within the scope of the invention, in addition to those enumerated herein, may be apparent from the representative descriptions herein. Such modifications and variations are intended to fall within the scope of the appended claims. The invention is to be limited only by the terms of the appended claims, along with the full scope of equivalents to which such representative claims are entitled.

I claim:

1. A card with a sensitive element, the card comprising:
   a substrate; and
   a sensitive element with a predetermined lifespan, wherein the sensitive element is configured to:
      activate responsive to being at least electronically acted upon through at least one selected from the group of a magnetic stripe reader, a near field communication (NFC) reader, and a radio-frequency identification (RFID) reader,
      begin the predetermined lifespan at a starting event, and
      finish the predetermined lifespan after a predetermined time period has passed.

2. The card of claim 1, wherein the sensitive element comprises at least an ultraviolet (UV) sensitive material.

3. The card of claim 1, wherein the sensitive element comprises at least an electrically sensitive material.

4. The card of claim 1, wherein the sensitive element comprises at least a temperature-sensitive material.

5. The card of claim 1, wherein sensitive element comprises a color-changing material, the color-changing material configured to be at least a first color at the starting event, and change gradually into at least a second color after a predetermined time period has passed.

6. The card of claim 1, wherein the sensitive element comprises a naturally degrading material.

7. The card of claim 1, wherein starting event is an electronic action performed on the card.

8. The card of claim 1, wherein the starting event is an exposure to at least one selected group of ultraviolet (UV) light and photoelectric light.

9. The card of claim 1, wherein the starting event is a predetermined temperature change on the card.

10. A system for activating a time sensitive card, the system comprising:
    a card comprising:
       a substrate; and
       a sensitive element with a predetermined lifespan, wherein the sensitive element is configured to:
          begin the predetermined lifespan configured to begin at a starting event, and
          finish the predetermined lifespan after a predetermined time period has passed;
    a data storage unit configured to store at least a date when the card has experienced a starting event; and
    a merchant device configured to:
       activate the sensitive element;
       trigger the starting event; and
       record, upon triggering the starting event, the date when the card has experienced a starting event and a monetary amount associated with the card in the data storage unit.

11. The system of claim 10, wherein the merchant device comprises a card reader comprising at least a magnetic stripe reader, a near field communication (NFC) reader, and a radio-frequency identification (RFID) reader.

12. The system of claim 11, wherein the card reader activates the sensitive element by electronically acting upon the card through a magnetic stripe reader, a near field communication (NFC) reader, and a radio-frequency identification (RFID) reader.

13. The system of claim 10, wherein the system further comprises a merchant server configured to track when the starting event has occurred and when the predetermined time period will end.

14. The system of claim 10, wherein the card comprises at least an ultraviolet (UV) sensitive material, an electrically sensitive material, and a temperature-sensitive material.

15. The system of claim 10, wherein the card further comprises at least one face on which the sensitive element is visible to a user associated with the card.

16. The system of claim 10, wherein the sensitive element further comprises microspheres filled with ink that is sensitive to UV light and temperature.

17. The system of claim 10, wherein the sensitive element comprises bioreactive chemicals.

18. A method for recording an activation of a time-sensitive card, the method comprising the steps of:
    providing a card comprising:
       a substrate, and
       a sensitive element with a predetermined lifespan, wherein the sensitive element is configured to:
          begin the predetermined lifespan at a starting event, and
          finish the predetermined lifespan after a predetermined time period has passed;
    activating the sensitive element by at least electronically acting upon the card through at least one selected from the group of a magnetic stripe reader, a near field communication (NFC) reader, and a radio-frequency identification (RFID) reader;
    triggering the starting event; and
    recording, upon triggering the starting event, at least a date when the card has experienced a starting event and a monetary amount associated with the card in a data storage unit.

19. The method of claim 18, wherein the steps further comprise tracking when the starting event has occurred and when the predetermined time period will end.

20. The method of claim 18, wherein:
    the sensitive element comprises at least one selected from the group of a visual element and a tactile element, and
    the method further comprises triggering, after activation, the at least one selected from the group of the visual element and the tactile element.

* * * * *